US011934844B2

(12) United States Patent
Hui et al.

(10) Patent No.: US 11,934,844 B2
(45) Date of Patent: *Mar. 19, 2024

(54) DOMAIN EVENTS FOR A MULTI-PLATFORM DATA STREAM

(71) Applicant: Qualtrics, LLC, Provo, UT (US)

(72) Inventors: Vernon W. Hui, Bellevue, WA (US); Joseph Scott Reese, Heber City, UT (US)

(73) Assignee: Qualtrics, LLC, Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/149,527

(22) Filed: Jan. 3, 2023

(65) Prior Publication Data

US 2023/0147910 A1   May 11, 2023

Related U.S. Application Data

(63) Continuation of application No. 17/390,385, filed on Jul. 30, 2021, now Pat. No. 11,544,079.

(51) Int. Cl.
  *G06F 9/44* (2018.01)
  *G06F 9/448* (2018.01)

(52) U.S. Cl.
  CPC .................. *G06F 9/4488* (2018.02)

(58) Field of Classification Search
  CPC .................................................. G06F 9/4488
  USPC .......................................................... 719/318
  See application file for complete search history.

(56) References Cited

U.S. PATENT DOCUMENTS

| 2014/0237487 | A1 | 8/2014 | Prasanna et al. |
| 2016/0004578 | A1 | 1/2016 | Selig, IV et al. |
| 2016/0139969 | A1 | 5/2016 | Song |
| 2019/0138524 | A1* | 5/2019 | Singh ............... G06F 16/00 |

(Continued)

OTHER PUBLICATIONS

Apache Kafka; "Apache Kafka is an open-source distributed event streaming platform used by thousands of companies for high-performance data pipelines, streaming analytics, data integration, and mission-critical applications." Date downloaded Aug. 31, 2021; https://kafka.apache.org.

(Continued)

*Primary Examiner* — Timothy A Mudrick
(74) *Attorney, Agent, or Firm* — Keller Preece PLLC

(57) ABSTRACT

This disclosure relates to methods, non-transitory computer readable media, and systems that relay domain-event objects within an enhanced multi-platform data stream to listen for and react to digital events indicated by the domain-event objects that occur across a wide variety of computing platforms. Specifically, the disclosed systems can receive domain-event objects within the multi-platform data stream. From among the domain-even objects transmitted through the multi-platform data stream, the disclosed systems can identify a domain-event object that is relevant to a digital-analytics platform by identifying domain-event objects that include properties satisfying domain-event-listener rules. Based on an entity identifier and an object event from the relevant domain-event object, the disclosed systems can perform a platform action within the digital-analytics platform (e.g., to react to a change in another platform as indicated by the domain-event object).

20 Claims, 15 Drawing Sheets

(56) References Cited

U.S. PATENT DOCUMENTS

2020/0285646 A1* 9/2020 Tudoran ............ G06F 16/24552
2020/0327371 A1* 10/2020 Sharma .................. H04L 67/34

OTHER PUBLICATIONS

U.S. Appl. No. 17/390,385, filed Aug. 22, 2022, Notice of Allowance.

* cited by examiner

DOMAIN EVENTS FOR A MULTI-PLATFORM DATA STREAM

CROSS-REFERENCE TO RELATED APPLICATIONS

This application is a continuation of U.S. application Ser. No. 17/390,385, filed on Jul. 30, 2021. The aforementioned application is encorporated herein by reference in its entirety.

BACKGROUND

In recent years, conventional analytics systems have increasingly drawn data from and operated co-dependently with other computing systems. In particular, many conventional analytics systems execute a separate-data-call computing model to transmit and receive one-off communications indicating changes made from other computing systems. The other computing systems may include sales, coding, messaging, or various other platforms that operate different software—often with different software languages and communication protocols than a conventional analytics system. To bridge communication barriers between the separate-data-call computing model of conventional analytics systems and other computing systems (e.g., server-to-server communications), some conventional analytics systems utilize one-off communications that rely on application programming interface (API) calls. Although conventional analytics systems often communicate with other computing systems to reflect data changes, they exhibit a number of technical shortcomings that hinder efficiently and easily communicating about (and adapting to) cross-system changes and actions.

By transmitting one-off requests to collect information on data or actions that occurred on other computing systems, for example, conventional analytics systems use data requests that lead to inefficient, delayed reactions to changes across multiple computing systems. In some cases, conventional analytics systems periodically request individual updates from other computing systems by using scheduled data requests. Because scheduled data requests occur at predetermined times, conventional analytics systems often identify changes in other computing systems (or transmit such changes) at a delayed time rather than when those changes occur in real time. Such data requests can accordingly create inefficient cross-system changes and actions. In addition, some conventional analytics systems often inefficiently rely on sequential requests (e.g., data-request calls that occur in a sequence instead of simultaneously) to create cross-system changes and take actions.

Due to the above-mentioned delayed and fragmented communications between computing systems, many conventional analytics systems inefficiently utilize computing resources. To illustrate, while using data-request calls to identify changes in other computing systems, many conventional analytics systems transmit data-request calls at separate times. Such sporadic data-request calls often lead to redundancies in actions that inefficiently utilize computing resources. For example, a conventional analytics system may execute an action for a specific data structure based on identifying that another computing system changed data. In an exercise in redundancy, an additional outside computing system may also individually identify that the other computing system changed data and, therefore, also take an action for the same specific data structure. Due to each computing system and the conventional analytics system having to individually identify data changes across each system, a conventional analytics system oftentimes redundantly performs similar actions (to that of other computing systems) on a same set of data at the inefficient cost of processing power and bandwidth for other tasks.

In addition to inefficient use of computing resources, conventional analytics systems often cannot easily communicate with a wide variety of other computing systems about changes in data or actions. For example, many conventional analytics systems rigidly communicate internal data or action changes to other internal (or external) computing systems by determining which computing systems to send information to regarding the changes. As many of the computing systems utilize different protocols to receive such communications, conventional analytics systems often utilize a complex and difficult-to-manage set of instructions to keep track of which internal (or external) computing system to send the information to and also how to send the information. Because only the conventional analytics system determines a relevancy of and sends such information under conventional and rigid protocols, these conventional analytics systems often fail to relay information that may have been important to another computing system.

Likewise, because many conventional analytics systems inflexibly utilize a separate-data-call computing model to send scheduled and isolated API calls, conventional systems can delay both information updates and corresponding reactions to the information updates. Because the requests often require customized API configurations for each computing system that the conventional analytics systems need to check, isolated date-request calls specific to each of the external (or internal) computing systems often create a seemingly endless list of different API configurations with which to rigidly comply.

Due to such inefficiencies and inflexibilities, many conventional analytics systems cannot easily communicate (or identify) changes in data or actions across a wide variety of computing systems to take cohesive and quick reacting actions in light of the wide variety of actions that are taken on the other computing systems.

SUMMARY

This disclosure describes one or more embodiments of systems, computer-readable media, methods, and computing devices that solve the foregoing problems and provide other benefits. In particular, the disclosed systems relay domain-event objects within an enhanced multi-platform data stream to listen for and react to digital events that occur across a wide variety of computing platforms. By relaying and streaming such domain-event objects, the disclosed systems provide or feed a multi-platform data stream to which various platforms (or systems) can listen for domain-event objects and dynamically execute changes, updates, or other platform actions in real (or near-real) time.

For instance, the disclosed systems can receive domain-event objects within the multi-platform data stream. From among the domain-even objects transmitted through the multi-platform data stream, the disclosed systems can identify a domain-event object that is relevant to a digital-analytics platform by identifying domain-event objects that include properties satisfying domain-event-listener rules. Based on an entity identifier and an object event from the relevant domain-event object, the disclosed systems can perform a platform action within the digital-analytics platform (e.g., to react to a change in another platform as indicated by the domain-event object). In some embodiments, in response to performing the platform action, the disclosed systems can also generate and transmit an additional domain-event object for the platform action into the multi-platform data stream.

BRIEF DESCRIPTION OF THE DRAWINGS

The detailed description is described with reference to the accompanying drawings in which.

DETAILED DESCRIPTION

Figure 1:
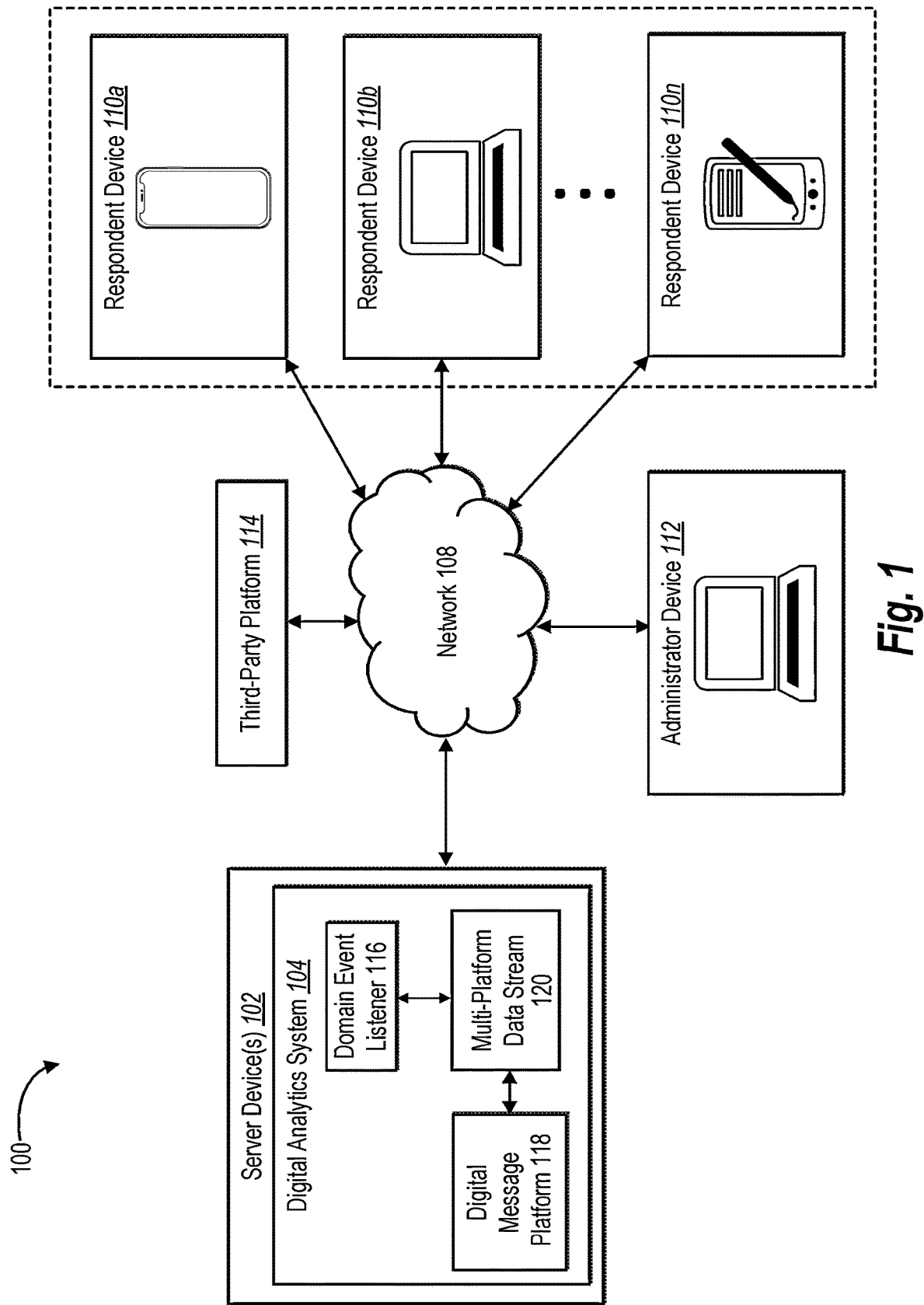
FIG. 1 illustrates a block diagram of an environment in which a digital analytics system can operate in accordance with one or more embodiments.

The disclosure describes one or more embodiments of a digital analytics system that can generate and relay domain-event objects within an enhanced multi-platform data stream to identify and perform platform actions in response to digital changes or other digital events that occur across a wide variety of other computing systems. By generating or digitally broadcasting domain-event objects within the multi-platform data stream, the digital analytics system can efficiently communicate events (e.g., changes or actions) in real (or near-real) time for various computing systems (or corresponding platforms) to identify using domain-event-listener rules and to perform corresponding actions triggered by the identified domain-event objects.

For instance, the digital analytics system can receive domain-event objects that include entity identifiers and object events within a multi-platform data stream. As explained further below, the multi-platform data stream may include a data stream of internal events and/or external events from third-party devices. From among the domain-event objects in the multi-platform data stream, the digital analytics system can identify a domain-event object that satisfies domain-event-listener rules corresponding to a digital-analytics platform of the digital analytics system. Based on identifying an entity identifier and an object event from the domain-event object, the digital analytics system can perform a platform action within the digital-analytics platform.

As just mentioned, the digital analytics system can receive domain-event objects in a multi-platform data stream. For example, the digital analytics system utilizes the multi-platform data stream to communicate domain-event objects and to listen for domain-event objects across multiple platforms. For example, the digital analytics system can utilize the multi-platform data stream to communicate domain-event objects between internal platforms (e.g., a digital analytics platform and other internal platforms) and/ or with third-party platforms (e.g., outside computing platforms or computing services over a network).

When generated or while in a multi-platform data stream, in one or more embodiments, a domain-event object includes an entity identifier that indicates an entity and an object event that indicates an event or action taken in relation to the entity. As part of creating such a domain-event object, the digital analytics system can generate a domain-event object schema that represents the type of entity corresponding to a specific domain-event object, defines the type of object events in relation to that entity, and domain-event-listener conditions that can be utilized for the specific domain-event object. Indeed, the digital analytics system can include such a domain-event object schema within a schema library such that multiple platforms can identify or transmit domain-event objects within the multi-platform data stream based on the characteristics of the domain-event objects in the schema library.

As noted above, the digital analytics system can utilize domain-event-listener rules to detect (or identify) domain-event objects from the multi-platform data stream. In some instances, the digital analytics system utilizes logic conditions that are flagged when a domain-event object satisfies logic conditions (e.g., satisfies the domain-event-listener rules). Indeed, in one or more embodiments, the digital analytics system receives domain-event-listener rules from an administrator device to associate with a domain-event object and a platform action. Upon utilizing the domain-event-listener rules to identify a domain-event object, the digital analytics system can also reference content related to the domain-event object by utilizing the entity identifier (or domain-event object identifier) associated with the domain-event object.

Utilizing the identified domain-event object as a trigger, in one or more embodiments, the digital analytics system performs a platform action. More specifically, the digital analytics system identifies the domain-event object to determine a change or other event that has occurred on another computing system (or a platform of the other computing system). Then, the digital analytics system performs a platform action to reflect the change or event that has occurred elsewhere (as indicated by the domain-event object). For instance, the digital analytics system can perform platform actions such as, but not limited to, transmitting electronic communications, configuring tickets, triggering platform processes, modifying platform workflows, updating a graphical user interface, uploading a digital reporting interface, or modifying a platform parameter within the digital-analytics platform of the digital analytics system. Furthermore, as mentioned above, upon performing a platform action, the digital analytics system can also generate a domain-event object to indicate the performed platform action and transmit the domain-event object into the multi-platform data stream.

To illustrate an example of the digital analytics system utilizing domain-event objects, in some cases, the digital analytics system generates a set of domain-event-listener rules used to listen for domain-event objects within a multi-platform data stream that relate to survey responses (e.g., an entity). In some instances, an external computing system executing a platform (e.g., a third-party website) can collect digital survey data from respondent devices and also provide a domain-event objects into the multi-platform data stream while collecting the digital survey data. Upon receiving a digital survey response, the external platform can generate and provide a domain-event object that indicates that the digital survey response was created. Then, a domain-event listener within the digital analytics system can identify the domain-event object from the multi-platform data stream—because the domain-event object relates to a specific survey response (e.g., low-customer-satisfaction score) and satisfies the set of domain-event-listener rules. Indeed, the digital analytics system can trigger a platform action to analyze the digital survey response indicated within the domain-event object (from the external platform) upon identifying the domain-event object within the multi-platform stream.

As suggested above, the disclosed digital analytics system overcomes several technical deficiencies of conventional analytics systems that execute separate-data-call computing models. By utilizing domain-event objects and an enhanced multi-platform data stream, to the disclosed digital analytics system flexibly and efficiently communicates across a wide variety of computing systems (or platforms associated with the systems) and dynamically reacts to digital events across a wide variety of computing systems. Indeed, the digital analytics system can utilize domain-event objects to communicate with other computing systems to take dynamic actions that are coordinated with a wide variety of other computing systems (e.g., as self-organizing systems that enable rich integration between systems). Unlike the separate-data-call computing models of many conventional analytics systems, the digital analytics system's democratized-domain-event streaming model utilizes domain-event objects to decrease communication errors, increase communication speed (e.g., in real or near-real time), and increase automation of tasks (e.g., user interface updates, updating datasets, initiating triggers for automated tasks as described herein) across a wider variety of internal platforms and/or external computing systems.

Indeed, the digital analytics system improves the flexibility of identifying changes in a wide variety of computing systems in real (or near-real) time by utilizing domain-event objects and the multi-platform data stream. In many cases, the digital analytics system can communicate with other computing systems using the domain-event objects in the multi-platform data stream without having to check for a compatible API to request such information at each individual computing system. By relaying the domain-event objects in the multi-platform data stream, system-to-system communication is democratized such that the digital analytics system can communicate to a wider variety of computing systems without having to individually manage API protocols for each of the systems as done in many conventional analytics systems that execute separate-data-call computing models.

To illustrate, in contrast to conventional analytics systems that execute separate-data-call computing models to periodically look for changes in other computing systems by making isolated and specific request calls for information, the digital analytics system can listen for events of other computing systems in real (or near-real) time without having to make isolated calls and without having to determine which other computing systems may have relevant information for the digital analytics system. In particular, the digital analytics system can configure domain-event object-listener rules for specific events that are relevant to the digital analytics system. Then, the digital analytics system can identify domain-event objects that indicate the specific digital events indicated by the domain-event objects as they occur on a wide variety of computing systems.

Moreover, by generating or relaying domain-event objects in the enhanced multi-platform data stream, the disclosed digital analytics system also improves the flexibility of automated system-to-system interactions. In particular, the domain-event objects and the multi-platform data stream enables the digital analytics system to listen for domain-event objects of a wide variety of computing systems and dynamically react to these other systems with reduced human interference. The digital analytics system can flexibly perform actions in response to other computing systems in real (or near-real) time by utilizing an algorithm and a computer structure that enables the creation of domain-event objects by the wide variety of computing systems. In other words, the enhanced multi-platform data stream enables the digital analytics system to identify domain-event objects and automatically perform platform actions based on identified domain-event objects.

Furthermore, unlike many conventional analytics systems that individually determine the relevant information to provide to multiple other computing systems, the digital analytics system can easily communicate to a wide variety of systems through domain-event objects and the multi-platform data stream with a reduced number of internal determinations. For example, the digital analytics system easily transmits domain-event objects for actions performed by the digital analytics system to the multi-platform data stream without having to determine the relevancy of the information for a number of individual computing systems. Rather, upon transmitting the domain-event objects to the multi-platform data stream, the digital analytics system facilitates a wide variety of computing systems to listen for events that are relevant to those systems and perform actions based on the identified domain-event objects.

In addition to flexibility, in some embodiments, the digital analytics system utilizes domain-event objects and the multi-platform data stream to improve the efficiency of system-to-system communications and multi-platform aware actions. To illustrate, by having access to domain-event objects from multiple platforms that indicate digital events that have occurred in relation to those platforms, the digital analytics system (and various other computing systems) can react to digital events from a wide variety of computing systems by performing platform actions in real time. In contrast to the separate-data-call computing models of conventional analytics systems that periodically field isolated data-request calls that can delay updates, the digital analytics system can listen in real (or near-real) time for domain-event objects created by other computing systems to identify digital changes or other events that have occurred at those computing systems via the enhanced multi-platform data stream.

In addition to faster and more efficient updates, the digital analytics system more efficiently broadcasts digital events in a multi-platform data stream in contrast to conventional API calls. Unlike conventional analytics systems that execute separate-data-call computing models that individually make isolated request calls to multiple other computing systems, the digital analytics system utilizes an enhanced multi-platform data stream that shares domain-event objects from each of a wide variety of computing systems (and/or internal platforms of the digital analytics system) such that each computing system can listen for and react to digital events indicated by the domain-event objects in real time. The multi-platform design of the multi-platform data stream accordingly enables the digital analytics system to reduce the number of overlapping (or redundant) platform actions to efficiently utilize its computing resources and processing bandwidth. To illustrate, unlike conventional analytics systems that may receive outdated information from other computing systems and perform actions in relation to particular actions that may have already been performed by another system, the digital analytics system receives and relays such actions in real time by listening for domain-event objects through the enhanced multi-platform data stream. Accordingly, the digital analytics system identifies such actions from domain-event objects and reduces the number of redundant tasks (or actions) performed by the digital-analytics platform of the digital analytics system. Additionally, unlike conventional API calls, in some cases, the digital analytics system utilizes a domain-event object that standardizes the metadata payload of communications to efficiently democratize communications between systems.

In addition to multi-platform efficiency, the digital analytics system more efficiently utilizes a computer and/or data structure through generating and utilizing domain-event objects and the enhanced multi-platform data stream. Indeed, by utilizing domain-event objects and the enhanced multi-platform data stream to change the computer model of how a wide variety of computing systems (or internal platforms of the digital analytics system) dynamically react to one another minimizes the impacts these computing systems (and the utilized network) have on communication networks. As mentioned above, the domain-event objects and the enhanced multi-platform data stream enables the digital analytics system to efficiently utilize its bandwidth to perform other actions and also reduces the amount of computing resources utilized on redundant tasks, react quickly to changes or other digital events across a wide variety of computing systems, and also improves automation by enabling dynamic and reactive functionalities across multiple systems (or platforms of the systems).

As illustrated by the foregoing discussion, the present disclosure utilizes a variety of terms to describe features and advantages of the digital analytics system. For example, as used herein, the term "domain-event object" refers to a data object that indicates a result or action in relation to an object. In particular, a domain-event object includes a data packet comprising (i) an entity identifier that indicates a particular entity and (ii) an object event that indicates the result or action in relation to the particular entity. For example, a domain-event object can include an entity identifier for an entity (e.g., contact, form, response, list member), an object event (e.g., created, published, assigned, sent), and other attributes (e.g., creation time, language, source, transmission time, originating platform). Additionally, in some embodiments, a domain-event object can also include attributes such as, but not limited to, sentiment values (e.g., numerical representations and/or text descriptions of a sentiment), experience data (e.g., data representing a user's or organization's impression of, description of, rating for, or reaction to another entity or a service), and/or data derived from machine learning models implemented by the digital analytics system (or another third-party system).

In some embodiments, a domain-event object corresponds to a domain-event schema. For example, as used herein, the term "domain-event schema" refers to an information structure for a domain-event object that defines the types of information, actions, and functions that are associated with the domain-event object. For instance, a domain-event schema can include definitions for, but is not limited to, the type of attributes to include, naming conventions, event types, entity identifier formats, and event-listener conditions for a domain-event object.

In addition, as used herein, the term "schema library" includes a collection of domain-event objects and corresponding domain-event object schemas. For instance, the digital analytics system can reference domain-event object schemas from a schema library to identify definitions for a domain-event object and domain-event-listener rules for the domain-event object when initializing and configuring a digital listener to listen for a specific domain-event object within a multi-platform data stream. When the specific domain-event object is identified, as indicated above, the disclosed digital analytics system can perform a corresponding platform action.

In addition, as used herein, the term "entity identifier" refers to a value, an alphanumeric, string, hash, or other digital indicator that references an entity (e.g., a specific entity). For example, entity identifier can include a pointer address to a particular entity. In addition, the entity identifier can also indicate an entity type. To illustrate, in one or more embodiments, an entity identifier for a particular entity (e.g., a survey response) can include a value of "dap.events.surveyresponse.1234" for a survey response from a domain-event object of a digital analytics platform with an identification number of 1234 for the specific survey response entity.

Furthermore, as used herein, the term "entity" refers to a data object that includes particular rules, data, and/or functions within a computing system. In some cases, an entity represents a data object defined by both an identity and a thread of continuity (e.g., creation, transmission, deletion times). The entity can include a reference to a set of functions and other information that defines the entity's identity. For example, an entity can include, but is not limited to, a contact, a form, a ticket, a response, a distribution, a survey invitation, a list member, a segment member, a survey response, a digital survey, an electronic communication, a sentiment, or a calculated trend value.

In some embodiments, a domain-event object can include an entity identifier that points to a root entity. In particular, the digital analytics system can identify a root entity from a domain-event object that branches to one or more entities. By doing so, the digital analytics system can utilize the entity identifier in a domain-event object to reference and retrieve a root entity and various other entities that branch (e.g., hierarchical relationships, cascading relationships) from the root entity. For example, the digital analytics system can identify a digital survey entity as a root entity that references branching entities (e.g., aggregate entities) such as, but not limited to, survey response entities, survey question entities, and answer choice entities. In addition, the digital analytics system can identify an entity in a domain-event object that can be a composition of other entities. For example, in some embodiments, a list entity within a domain-event object do not include list members (e.g., the list entity being a composite entity). In some instances, the digital analytics system can retrieve the entities (e.g., the list members) of the composite entity (e.g., the list entity) by traversing a database utilizing the composite entity as a reference. In some embodiments, a domain-event object includes various types of entities (e.g., a root entity, composite entity, a standalone entity, an entity that is a branched entity from a root entity or composite entity).

As used herein, the term "object event" refers to an indication of a result, action, status, or fact associated with a domain-event object in relation to an entity. For example, an object event can represent a code or text descriptor that describes a result, action, status, or fact in relation to an entity. As an example, an object event can include, but is not limited to, a text descriptor that indicates a creation of, an assignment of, a transmission of, a modification to, an interaction with, a publication of, an update of, a sharing of, a subscription to, an unsubscription to, a scheduling of, a calculation of, a rejection of, a proposal of, or a review (or in-review status) of a digital entity. For instance, an object event can include a descriptor that indicates whether a digital survey has been activated or deactivated for a digital survey entity (referenced within a domain-event object).

In one or more embodiments, the digital analytics system monitors such domain-event objects and corresponding entities and objects events in the context of a platform for experience management of user interactions with an organization. For example, an entity and object event can identify or represent a survey response that is submitted by a user device through an application or a website monitored or tracked by a platform for experience management for a particular organization (e.g., third-party application or organization's website). Moreover, the entity and object event can also identify or represent a user interaction (e.g., a view, a selection) of a user device within an application or website monitored or tracked by a platform for experience management for a particular organization. In some cases, the entity and object event can also include interactions of users within an organization (e.g., employee interactions with the organization, employee interactions with other employees, employee interactions with users of an organizational website and/or application). As explained further below, in some cases, such object events can correspond to a domain-event object that triggers a platform action executed by or within a platform for experience management.

Furthermore, as used herein, the term "digital message platform" refers to a storage and/or transmission component that facilitates the storage and/or transfer of domain-event objects that is accessible by multiple platforms (and/or computing systems that implement the multiple platforms) as a multi-platform data stream. For instance, a digital message platform can include a memory component that enables storage and access to one or more domain-event objects to create a multi-platform data stream of domain-event objects. In some cases, the digital analytics system utilizes a digital message platform that facilitates a multi-platform data stream such as, but not limited to, a publisher-subscriber platform (e.g., Apache Kafka) and/or another streaming platform implementation.

As mentioned above, a digital message platform can facilitate a multi-platform data stream of domain-event objects. In one or more embodiments, the term "multi-platform data stream" refers to a stream of information (e.g., data packets of domain-event objects) accessible by multiple platforms (e.g., through a digital message platform). For example, a multi-platform data stream of a digital message platform can be accessed by multiple computing systems (or computing devices) to identify or transmit domain-event objects between the multiple computing systems (or associated platforms). Indeed, the digital analytics system can utilize a multi-platform data stream within a digital message platform that is implemented using any communication platforms and technologies suitable for transporting data and/or communication signals, including the examples described below with reference to FIGS. 11 and 12.

As used herein, the term "domain-event-listener rule" refers to a logic rule or condition that defines a domain-event object, an entity identifier for a domain-event object, an object event for a domain-event object, or other attribute of a domain-event object targeted for identification. For instance, a domain-event-listener rule can include Boolean logic to compare attributes of a domain-event object to conditions for those attributes. In particular, a domain-event-listener rule can include logic conditions such as, but not limited to, a check for a type of digital entity, a check for a digital-entity-creation time, a check for an object-event-occurrence time, or a check for an object-event type. As an example, a domain-event-listener rule can include a condition to check if a type of digital entity is a "survey response" and to check if an object-event type is "created." Indeed, the digital analytics system can identify (or listen for) domain-event objects within a multi-platform data stream that satisfy the above-mentioned domain-event-listener rule by identifying a domain-event object that includes a survey response as the digital entity type and "created" as the object event (e.g., returning a true flag for the logic condition).

As used herein, the term "platform action" refers to an act, modification, process, or operation in relation to data corresponding to a particular platform of a system. In particular, a platform action can include a variety of actions, modifications, processes, or operations that modify or create the state, location, accessibility, display, or value of data or data objects. For example, a platform action can include, but is not limited to, a transmission of an electronic communication, a configuration of a ticket, a triggering of a platform process, a modification of a platform workflow, an update of a graphical user interface (e.g., digital reporting interface), a modification of a platform parameter, or creation of a digital calendar event.

Relatedly, the term "platform" refers to a technological environment for which software components and applications are developed and within which computing devices operate software components and applications. For example, a platform may include server devices that execute a specific software language or machine language code and also run a type of software or suite of compatible software applications. A platform may likewise use a data model that is specific to the platform and that specifies data formats (e.g., entities, object events) for storing, sending, and receiving data. Accordingly, one platform's data model may differ from and be incompatible with another platform's data model.

In addition, the term "digital analytics platform" refers to a technological environment in which software components and applications operate to analyze and determine conclusions concerning data. For example, a digital analytics platform can include software components and applications to generate, analyze, and present conclusions or summaries of digital surveys. The digital analytics platform can also include software components and applications to receive, analyze, and/or communicate various components of digital surveys (e.g., survey responses, digital survey reports, digital survey links) via electronic communication components, machine learning components, digital survey management components. In some cases, the digital analytics platform can include a software component and/or application that performs a specific function (e.g., analyzing digital surveys) within an overarching computing system (e.g., the digital analytics system) that receives, analyzes, and/or communicates various components of digital surveys.

Turning now to the figures, FIG. 1 illustrates a block diagram of a system 100 (or environment) in which a digital analytics system 104 operates in accordance with one or more embodiments. As illustrated in FIG. 1, the system 100 includes server device(s) 102, an administrator device 112, respondent devices 110a-110n, and a third-party platform 114. Furthermore, as shown in FIG. 1, the server device(s) 102 include the digital analytics system 104. In addition, the digital analytics system 104 includes a domain event listener 116, a digital message platform 118, and a multi-platform data stream 120.

Generally, the administrator device 112 and respondent devices 110a-110n may be any one of various types of client devices. For example, the administrator device 112 and respondent devices 110a-110n may be mobile devices (e.g., a smart phone, tablet), laptops, desktops, or any other type of computing devices, such as those described below with reference to FIGS. 11 and 12. Additionally, the server device(s) 102 may include one or more computing devices, including those explained below with reference to FIGS. 11 and 12. The server device(s) 102, the administrator device 112, the third-party platform 114, and the respondent devices 110a-110n may communicate using any communication platforms and technologies suitable for transporting data and/or communication signals, including the examples described below with reference to FIGS. 11 and 12.

In one or more embodiments, the administrator device 112 and the respondent devices 110a-110n are associated with a type of user. An administrator is associated with the administrator device 112 and uses the administrator device 112 to manage the creation and configuration of domain-event objects (and, in some cases, the creation and distribution of a digital surveys). Furthermore, respondents are respectively associated with the respondent devices 110a-110n and provide data (e.g., digital survey responses and website/application interaction data).

To access the functionalities of the digital analytics system 104, in certain embodiments, an administrator interacts with an administrator device application on the administrator device 112. Similarly, to access other functions of the digital analytics system 104, in some implementations, respondents interact with respondent device applications, respectively, on the respondent devices 110a-110n. In some embodiments, one or both of the administrator device application and the respondent device applications comprise web browsers, applets, or other software applications (e.g., native applications or web applications) available to the administrator device 112 or the respondent devices 110a-110n, respectively. Additionally, in some instances, the digital analytics system 104 provides data packets including instructions that, when executed by the administrator device 112 or the respondent devices 110a-110n, create or otherwise integrate the administrator device application or the respondent device applications within an application or webpage for the administrator device 112 or the respondent devices 110a-110n, respectively.

As an overview, the server device(s) 102 provide the administrator device 112 access to the digital analytics system 104 by way of the network 108. In one or more embodiments, by accessing the digital analytics system 104, the server device(s) 102 provide one or more user interfaces and/or data to the administrator device 112 to enable an administrator to configure domain-event objects, domain-event-listener rules, and/or platform actions associated with the domain-event-listener rules. For example, the digital analytics system 104 can include a website (e.g., one or more webpages) or utilize an administrator device application on the administrator device 112 to enable the administrator to create domain-event objects, domain-event-listener rules, and/or platform actions associated with the domain-event-listener rules. In addition, the digital analytics system 104 can also provide the website or the administrator device application on the administrator device 112 to enable the administrator to create digital surveys or other digital content for distribution to the respondent devices 110a-110n, configure digital survey data, access digital survey data, or access other analytics tools and/or functions corresponding to the digital analytics system 104 (e.g., via graphical user interfaces).

Furthermore, in some embodiments, the respondent devices 110a-110n interact with the administrator device 112, the digital analytics system 104, or the third-party platform 114. From the interactions, the administrator device 112 (or the third-party platform 114 or the digital analytics system 104) identifies data (e.g., digital survey data and/or other interactions with websites or applications) from the respondent devices 110a-110n. Indeed, the digital analytics system 104 can utilize the data from the respondent devices 110a-110n to generate digital survey statistics, reports, and/or other analytics data. Such digital survey statistics, reports, and/or other analytics data can be provided to the administrator device 112 (within graphical user interfaces as analytics tools) by the digital analytics system 104.

During the actions taken by the digital analytics system 104 and/or the actions taken by either the administrator device 112 and/or the respondent devices 110a-110n, the digital analytics system 104 generates domain-event objects for the actions and data modifications. Additionally, in reference to FIG. 1, the digital analytics system 104 places these domain-event objects into the digital message platform 118 of the digital analytics system. Indeed, the digital analytics system 104 utilizes the digital message platform 118 to share domain-event objects across different platforms that internally operate within the digital analytics platform.

For example, the digital analytics system 104 can include a variety of platforms (e.g., a digital analysis platform, an electronic communication platform, a graphical user interface platform, a billing platform) that can each utilize domain-event listeners that listen for domain-event objects. Indeed, a platform from within the digital analytics system 104 can generate domain-event objects for an action taken by the particular platform. Then, in one or more embodiments, the domain-event listeners of the other platforms can identify the generated domain-event object and take one or more platform actions that reflect the generated domain-event object (e.g., if the domain-event object satisfies a set of domain-event-listener rules).

Furthermore, in one or more embodiments, the digital analytics system 104 also feeds or places domain-event objects into the multi-platform data stream 120. Indeed, the digital analytics system 104 can utilize the multi-platform data stream 120 to transmit (or share) domain-event objects between internal platforms of the digital analytics system 104 (e.g., through the digital message platform) and also to third-party platforms via the network 108. For example, the digital analytics system 104 (via one or more platforms) can introduce domain-event objects within the multi-platform data stream 120. Then, the third-party platforms can identify the domain-event objects within the multi-platform data stream 120 and perform platform actions based on the domain-event objects.

In addition, the digital analytics system 104 can receive domain-event objects within the multi-platform data stream 120 from third-party platforms. Once received in the multi-platform data stream 120, a variety of platforms within the digital analytics system 104 can receive the domain-event objects from the multi-platform data stream 120 (e.g., via the digital message platform 118). Indeed, the various platforms of the digital analytics system 104 can utilize domain-event-listener rules within the domain event listener 116 (e.g., specific domain-event listeners to the platforms) to identify relevant domain-event objects that satisfy the domain-event-listener rules. Subsequently, the one or more platforms (or the digital analytics system 104) can perform one or more platform actions based on the identified domain-event objects (in accordance with one or more embodiments).

In some embodiments, the server device(s) 102, the administrator device 112, the respondent device(s) 110a-110n, and the third-party platform 114 can communicate over the network 108. For instance, the network 108 enables communication between components of the system 100. In one or more embodiments, the network 108 includes a suitable network and may communicate using any communication platforms and technologies suitable for transporting data and/or communication signals, examples of which are described with reference to FIGS. 11 and 12. Furthermore, although FIG. 1 illustrates the server device(s) 102, the administrator device 112, the respondent device(s) 110a-110n, and the third-party platform 114 communicating via the network 108, in certain implementations, the various components of the system 100 communicate and/or interact via other methods (e.g., the server device(s) 102 and the administrator device 112 communicating directly).

Furthermore, although FIG. 1 illustrates the digital analytics system 104 being implemented by a particular component and/or device (e.g., server device(s) 102) within the system 100, the digital analytics system 104 can be implemented, in whole or in part, by other computing devices and/or components in the system 100. For example, the digital analytics system 104 can be implemented in whole, or in part, by the administrator device 112. In particular, the digital analytics system 104 can operate on the administrator device 112 to generate domain-event objects and listen for domain-event objects.

Figure 2:
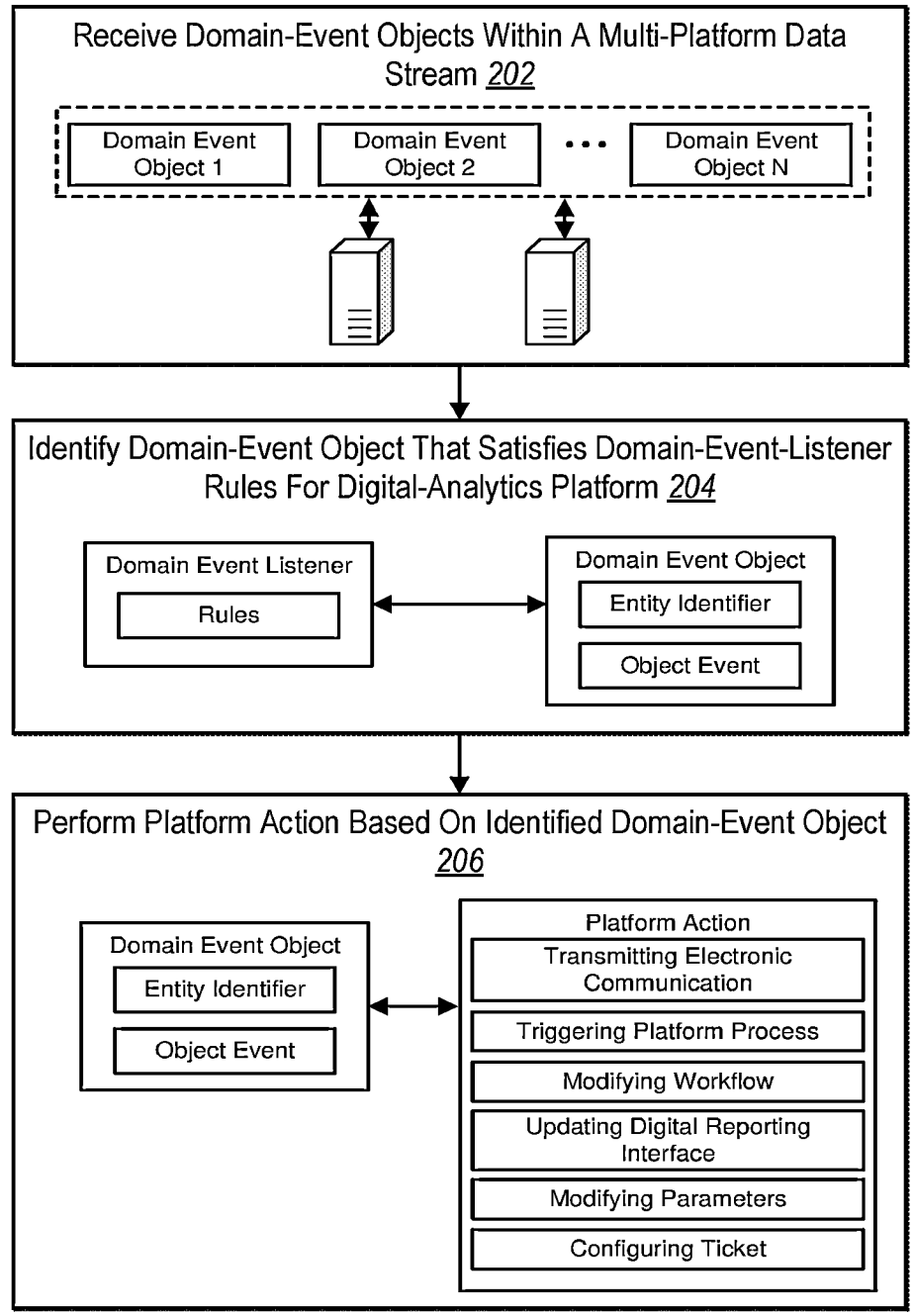
FIG. 2 illustrates an overview of a digital analytics system identifying a domain-event object from a multi-platform data stream and performing a platform action based on the identified domain-event object in accordance with one or more embodiments.

As mentioned above, the digital analytics system 104 utilizes domain-event objects within a multi-platform data stream to communicate and automatically react to digital events occurring across a wide variety of platforms. FIG. 2 provides a brief overview of one embodiment of the digital analytics system 104 identifying a domain-event object from a multi-platform data stream and performing a platform action based on the identified domain-event object. More specifically, FIG. 2 illustrates the digital analytics system 104 receiving domain-event objects within a multi-platform data stream and utilizing domain-event-listener rules to identify a given domain-event object from the multi-platform data stream. Furthermore, FIG. 2 also illustrates the digital analytics system 104 performing a platform action based on the identified domain-event object that satisfies the domain-event-listener rules.

As shown in FIG. 2, the digital analytics system 104 receives domain-event objects within a multi-platform data stream in an act 202. As illustrated in the act 202 of FIG. 2, the digital analytics system 104 utilizes a multi-platform data stream to receive domain-event objects (e.g., domain event objects 1-N) from multiple platforms (e.g., server devices of internal platforms of the digital analytics system 104 and also third-party platforms). The domain-event objects correspond to domain-event object schemas from a schema library such that the digital analytics system 104 (and other computing systems) can recognize the domain-event objects within the multi-platform data stream. Indeed, the digital analytics system 104 generating domain-event objects and a domain-event object schema are described in greater detail below (e.g., in relation to FIG. 3).

Furthermore, as shown in FIG. 2 in act 204, the digital analytics system 104 identifies a domain-event object that satisfies domain-event-listener rules corresponding to a digital-analytics platform. Indeed, the digital analytics system 104 checks conditions of the domain-event-listener rules to attributes of the domain-event objects within the multi-platform data stream to identify domain-event objects that satisfy the domain-event-listener rules. The domain-event objects that satisfy the domain-event-listener rules are selected by the digital analytics system 104. Indeed, as shown in the act 204 of FIG. 2, the identified domain-event object includes an entity identifier and an object event. The digital analytics system 104 identifies domain-event object utilizing domain-event-listener rules and generates domain-event-listener rules are described in greater detail below (e.g., in relation to FIGS. 4, 5, and 7-8).

Additionally, as shown in act 206 of FIG. 2, the digital analytics system 104 performs a platform action based on the identified domain-event object. In particular, the digital analytics system 104 can perform a platform action in response to an object event identified within a domain-event object. For example, as shown in FIG. 2, the digital analytics system 104 performs platform actions, such as transmitting an electronic communication, triggering a platform process, modifying a workflow, updating a digital reporting interface, modifying parameters, and/or configuring a ticket. Indeed, this disclosure describes platform actions and the digital analytics system 104 performing platform actions based on a domain-event object in greater detail below (e.g., in relation to FIGS. 4, 5, and 6).

As mentioned above, the digital analytics system 104 can identify a domain-event object generated by an administrator device. In particular, an administrator device can generate or select settings for a domain-event object schema that includes a structure for a domain-event object. The domain-event object schema can be included in a schema library such that the digital analytics system 104 (and/or other computing systems) may generate domain-event objects or listen for domain-event objects as defined by the domain-event object schema.

Figure 3:
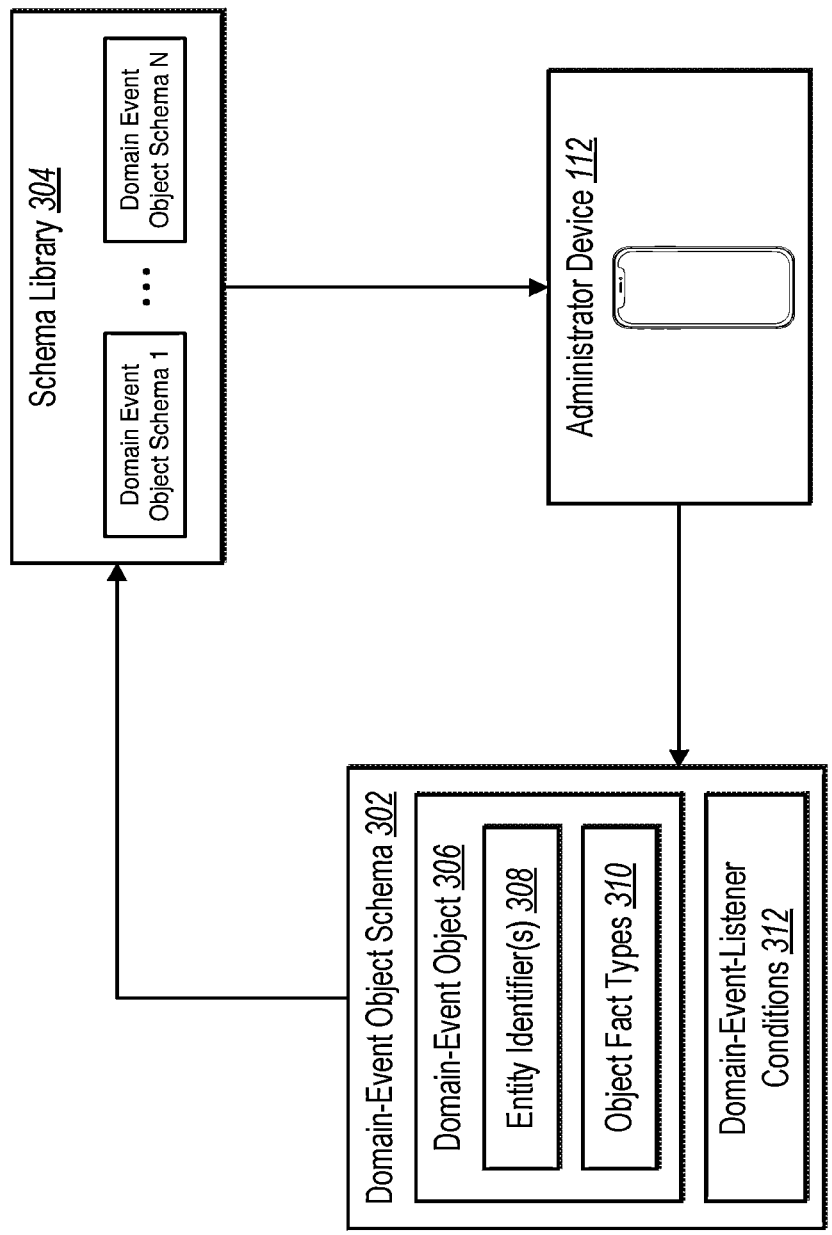
FIG. 3 illustrates a schematic diagram of a digital analytics system generating a domain-event object schema in accordance with one or more embodiments.

For instance, FIG. 3 illustrates the administrator device 112 generating a domain-event object schema 302 for a schema library 304. In particular, as shown in FIG. 3, the administrator device 112 provides selections for a domain-event object 306 that includes one or more entity identifiers 308 and object-event types 310. In addition, the administrator device 112 also provides domain-event-listener conditions 312 for the domain-event object 306. As shown in FIG. 3, the one or more entity identifiers 308, the object-event types 310, and the domain-event-listener conditions 312 form the domain-event object schema 302.

Additionally, as shown in FIG. 3, the digital analytics system 104 includes the domain-event object schema 302 from the administrator device 112 into the schema library 304. Indeed, as shown in FIG. 3, the schema library 304 includes multiple domain event object schemas (e.g., domain event object schemas 1-N). In one or more embodiments, the digital analytics system 104 (and/or other computing systems) can access the domain event object schemas within the schema library 304 to determine domain-event-listener rules to utilize to listen for specific domain-event objects in a multi-platform data stream. In some embodiments, the domain-event-object schemas in the schema library can include domain-event-object schemas that are generated by administrator devices operating within the digital analytics system 104 and/or various combinations of other third-party platforms.

In some instances, the administrator device 112 can provide entity identifier information to define entity identifiers for a domain-event-object schema. Particularly, the administrator device 112 can provide (or indicate) a type of entity for the domain-event object schema. For example, the type of entity can include an indication of a particular entity that is associated with the domain-event object schema. In some instances, the entity type is a defined object within the digital analytics system 104 (or other computing systems) that includes pre-existing functionalities and/or data structures. To illustrate, the digital analytics system 104 can generate a domain-event-object schema for survey responses by including a survey response object as an entity type. Then, in one or more instances, the domain-event objects based on the domain-event-object schema for a survey response include a reference to a survey response and the one or more available functionalities and/or data structures of a survey response object.

Additionally, the digital analytics system 104 can generate an entity identifier for a specific entity (or entity type) selected by the administrator device 112. For example, the digital analytics system 104 can generate an entity identifier that indicates an entity type and also points to a specific entity. In some cases, the digital analytics system 104 can utilize an internal identification of the entity as the entity identifier (e.g., an identification string or number that points to the entity within the digital analytics system 104 or one or more platforms operating within the digital analytics system 104). In one or more embodiments, the digital analytics system 104 (via a variety of platforms) utilize the entity identifier associated with the domain-event object to reference the entity corresponding to the domain-event object.

Moreover, the digital analytics system 104 can also generate object-event types for a domain-event object schema. In particular, the digital analytics system 104 can receive selections (or definitions) for object-event types for a domain-event object schema. Then, the digital analytics system 104 can correspond the object-event types within the domain-event object schema in relation to a received entity type. In one or more embodiments, the received object-event types can define the types of events (e.g., actions or states) that can occur in relation to the entity corresponding to the domain-event object. As such, the digital analytics system 104 can perform an action in relation to an entity and generate domain-event objects for the entity specified in the domain-event object schema with a given object event that represents the performed action.

Furthermore, the digital analytics system 104 can include (or generate) domain-event-listener conditions for a domain-event object schema. To illustrate, the digital analytics system 104 can receive selections (or configurations) of logic operations as domain-event-listener conditions for the domain-event object schema. In particular, the digital analytics system 104 can receive a various combinations of logic operations that indicate a logic comparison between a selected entity and object event associated with the domain-event object schema. As an example, the administrator device 112 can provide a specific combination of logic that checks whether an entity experiences a combination of object events (e.g., a survey response is created and stored, a survey response is created or stored, a survey response is created and not stored). In some instances, the domain-event object schema can include such combinations of logic as default domain-event-listener conditions that can be selected while configuring domain-event-listener rules.

In some cases, the digital analytics system 104 can also include domain-event-listener conditions in a domain-event object schema that define various logic conditions that can be utilized for the domain-event object. For example, the digital analytics system 104 can include domain-event-listener conditions, such as, but not limited to, a "greater than" condition, a "less than" condition, an "equal to" condition, or a "contains" condition.

In addition, the digital analytics system 104 can also include (or generate) other attribute descriptor types for a domain-event object schema. For example, the attribute descriptor types can include options to include various attribute descriptors in relation to an entity, object event, or the domain-event object. In some cases, the digital analytics system 104 can include attribute descriptor types to indicate information for a specific entity or a specific object event.

To illustrate, the digital analytics system 104 can include attribute descriptor types to indicate information for, but not limited to, a type of digital entity, a digital-entity-creation time, an object-event-occurrence time, or an object-event type. Utilizing the attribute descriptor types in the domain-event object schema, a digital analytics system 104 can provide information for a specific entity or specific object event within a domain-event object for the specific entity or the specific object event. Additionally, in some instances, the digital analytics system 104 can include attribute descriptor types to indicate a language associated with a domain-event object, a storage (or server) address from the originating platform (or environment) of the domain-event object, or metadata for the entity or object event. Furthermore, the digital analytics system 104 can also include attribute descriptor types to indicate an application (or plug in) that handles the entity or object event, a session ID or keys associated with the entity or object event, or other configuration flags (e.g., whether setup is required for the entity, whether a selection of an entity is required for the domain-event object).

In one or more embodiments, the digital analytics system 104 includes such logic conditions within a domain-event object schema for each type of domain-event object. In some instances, the digital analytics system 104 can utilize the logic conditions from domain-event-listener conditions within a domain-event object schema to check for (or listen for) information of the entity, information of an object event, and/or with one or more attribute descriptors. For example, the digital analytics system 104 can utilize a logic condition from the domain-event-listener condition to listen for a specific creation time or occurrence time.

Furthermore, in one or more embodiments, the digital analytics system 104 includes application data within a domain-event object schema. To illustrate, the digital analytics system 104 can generate a domain-event object schema to include definitions and references for an application utilized for a given entity represented by the domain-event object schema. Indeed, the application data can include definitions that enable a system to utilize functions of the application in relation to the entity identified by the domain-event object schema.

As an example, a domain-event object schema for an e-mail entity can include application data for an e-mail application that is utilized to create, transmit, and/or view e-mails. The digital analytics system 104 can utilize the application data within the domain-event object for the e-mail entity to utilize the e-mail application to perform platform action in relation to the e-mail entity (upon identifying a domain-event object from the domain-event object schema with a domain-event listener).

In some embodiments, the digital analytics system 104 utilizes a domain-event object schema that formats domain-event objects into JSON files (or files for another structured format markup language or schema). For instance, the digital analytics system 104 can utilize fields of a JSON file to represent fields for the entity type, object-event type, and various other attribute descriptor types described above. In one or more embodiments, the digital analytics system 104 includes information for the entity type, object-event type, and the various other attribute descriptor types by populating information within JSON fields.

As mentioned above, the digital analytics system 104 can generate (and pair together) domain-event-listener rules and platform actions for a domain-event listener based on received domain-event-listener condition and platform action selections. In particular, the digital analytics system 104 can receive selections for domain-event-listener conditions and platform actions from an administrator device 112 within a graphical user interface. Then, the digital analytics system 104 can utilize domain-event-listener rules (from the selected domain-event-listener conditions) and selected platform actions to listen for domain-event objects in a multi-platform data stream that satisfy the domain-event-listener rules. Indeed, the digital analytics system 104 can also perform the selected platform actions in relation to the identified domain-event objects.

Figure 4:
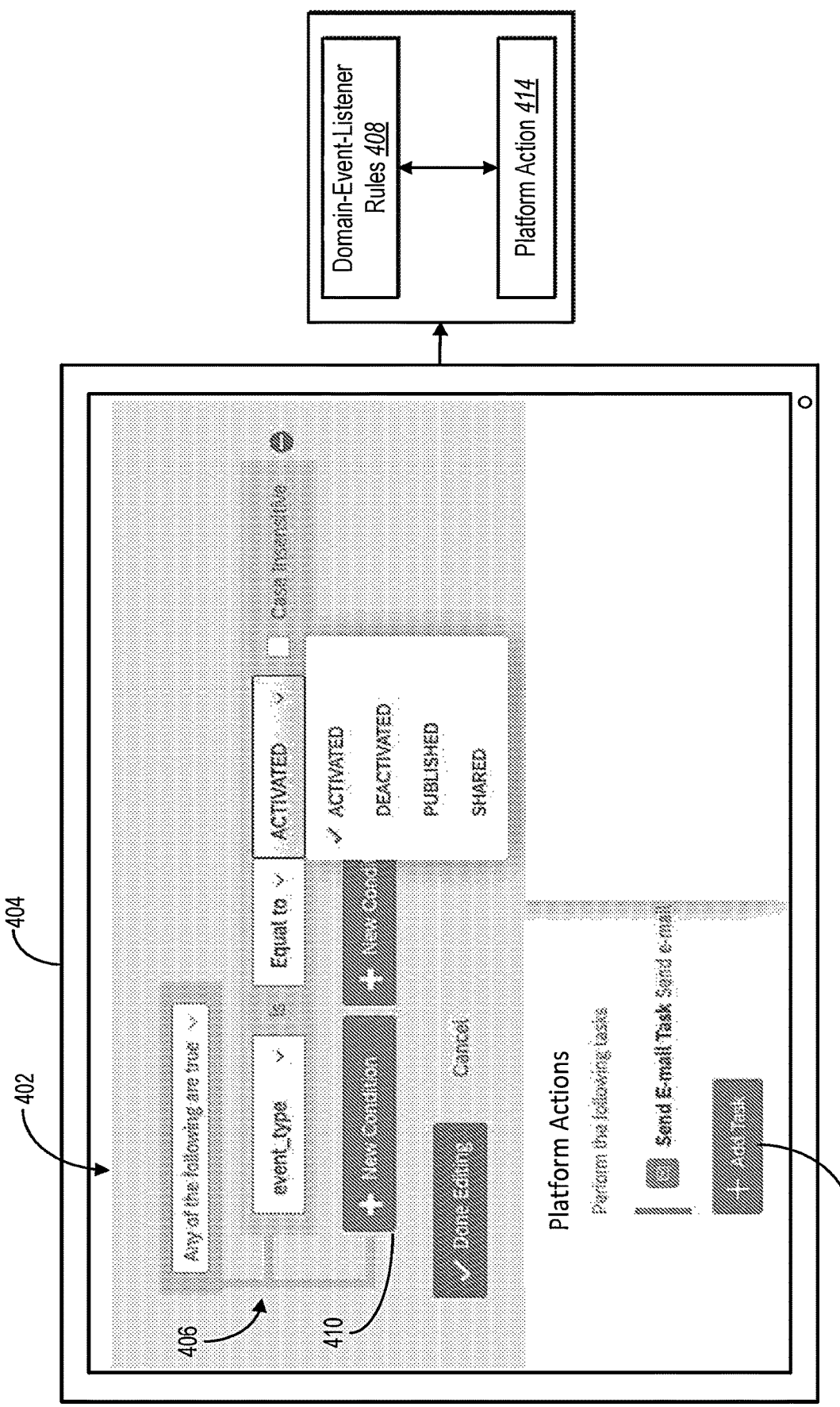
FIG. 4 illustrates a graphical user interface for selectable domain-event-listener conditions and selectable platform-action options in accordance with one or more embodiments.

For example, FIG. 4 illustrates a graphical user interface in which an administrator device displays selectable domain-event-listener conditions and selectable platform-action options. As shown in FIG. 4, the digital analytics system 104 provides, for display within a graphical user interface 402 of an administrator device 404, selectable domain-event-listener conditions 406. Indeed, as shown in FIG. 4, the digital analytics system 104 can receive, from the administrator device 404, selections of an attribute corresponding to a domain-event object as described above (e.g., an object-event type, an entity type) within the selectable domain-event-listener conditions 406. Additionally, as illustrated in FIG. 4, the digital analytics system 104 can also receive, from the administrator device 404, logic conditions in relation to the domain-event object attribute within the selectable domain-event-listener conditions 406. Furthermore, as also illustrated in FIG. 4, the digital analytics system 104 can receive, from the administrator device 404, values for the selected domain-event object attribute for the logic conditions within the selectable domain-event-listener conditions 406.

Upon receiving a selection of the domain-event object attribute, condition logic, and a value for the domain-event object attribute within the selectable domain-event-listener conditions 406, the digital analytics system 104 can utilize the selections as domain-event-listener rules. As an example, as shown in FIG. 4, the digital analytics system 104 can receive, as a domain-event-listener condition within the selectable domain-event-listener conditions 406, a condition that listens for object events (e.g., "event_type") that matches with (e.g., "is equal to") an object event of "activated." As further shown in FIG. 4, the digital analytics system 104 can add the above-mentioned domain-event-listener condition, selected from the selectable domain-event-listener conditions 406, as a domain-event-listener rule in a set of domain-event-listener rules 408.

In some embodiments, the digital analytics system 104 provides the selectable domain-event-listener conditions 406 for display within the graphical user interface 402 of the administrator device 404 by populating the selectable options (e.g., in a drop-down menu, as radio buttons) utilizing information from a domain-event object schema of a selected entity (or domain-event object). In particular, the digital analytics system 104 can receive a request to generate domain-event-listener rules for a particular entity or domain-event object. Then, the digital analytics system 104 can provide the selectable domain-event-listener conditions 406 for display within the graphical user interface 402 by including values (or information) for the various attributes and logic conditions from the domain-event object schema (as described above) into the selectable domain-event-listener conditions 406.

To illustrate, in reference to FIG. 4, the digital analytics system 104 can identify that the particular domain-event object includes the object events "activated," "deactivated," "published," and "shared" within a domain-event object schema. Accordingly, as shown in FIG. 4, the digital analytics system 104 provides, for display, the object events "activated," "deactivated," "published," and "shared" as the selectable options for "event_type" within the selectable domain-event-listener conditions 406. Indeed, the digital analytics system 104 can populate fields of various domain-event object attribute types within selectable options of a graphical user interface utilizing a domain-event object schema.

As mentioned above, in one or more embodiments, the digital analytics system 104 provides an option to select a number of domain-event-listener conditions (e.g., as a combination). For example, as shown in FIG. 4, the digital analytics system 104 provides a selectable option 410 to add additional domain-event-listener conditions. Upon receiving a selection of the selectable option 410, the digital analytics system 104 can receive, via the administrator device 404, a combination of domain-event-listener conditions that are combined using operational logic relationships (e.g., an "and" operator or an "or" operator).

As further shown in FIG. 4, the digital analytics system 104 provides, for display within a graphical user interface 402 of an administrator device 404, platform-action options 412 for a platform action to be performed upon satisfaction of the domain-event-listener conditions selected from the selectable domain-event-listener conditions 406. In particular, as shown in FIG. 4, the digital analytics system 104 provides, for display, the platform-action options 412 that can be selected in association with the selectable domain-event-listener conditions 406.

Upon receiving a selection of one or more platform actions from the platform-action options 412, the digital analytics system 104 can generate a pairing between platform actions 414 and the domain-event-listener rules 408 (e.g., from the selected domain-event-listener conditions). Indeed, although FIG. 4 illustrates the platform-action options 412 as an option to perform a task to transmit an electronic communication (e.g., an e-mail), the digital analytics system 104 can include various platform actions (in accordance with one or more embodiments herein) within the platform-action options 412.

In one or more embodiments, the digital analytics system 104 can store the selected domain-event-listener rules and platform actions that are associated with (or paired to) the domain-event-listener rules (e.g., to initiate the platform actions upon satisfaction of the listener rules). Furthermore, the digital analytics system 104 can utilize a domain-event listener to compare (or check) incoming domain-event objects within a multi-platform data stream to the stored pairings of domain-event-listener rules and platform actions. In particular, the digital analytics system 104 identifies domain-event objects that satisfy the domain-event-listener rules and performs the paired platform action in relation to the entity indicated by the identified domain-event object.

As mentioned above, the digital analytics system 104 can utilize domain event objects, configured domain-event-listener rules, and a multi-platform data stream to communicate between multiple systems (that include one or more platforms) and take multi-platform aware actions. For example, FIG. 5 illustrates multiple computing systems respectively identifying domain-event objects from a multi-platform data stream and dynamically performing platform actions in response to platform actions taken on other computing systems.

Figure 5:
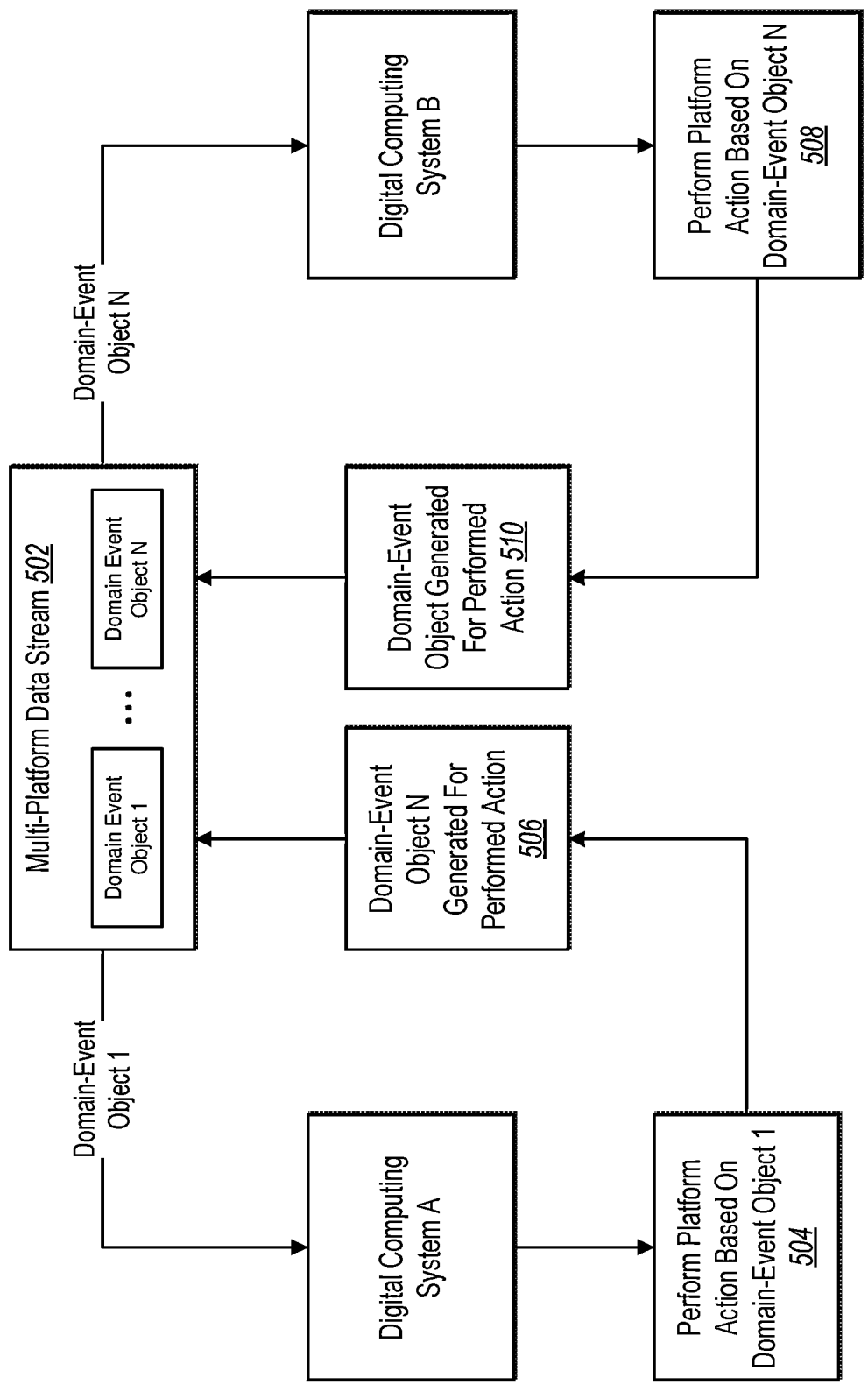
FIG. 5 illustrates a schematic diagram of multiple digital computing systems respectively identifying domain-event object from a multi-platform data stream and performing platform actions based on the respectively identified domain-event objects in accordance with one or more embodiments.

Indeed, as shown in FIG. 5, the digital computing system A (e.g., the digital analytics system 104) can identify a domain-event object 1 from the multi-platform data stream 502 (utilizing domain-event-listener rules). Then, as illustrated in FIG. 5, the digital computing system A performs a platform action based on the identified domain-event object 1 in an act 504. Upon performing the platform action in the act 504, the digital computing system A also generates and provides a domain-event object N 506 generated for the platform action performed in the act 504. Indeed, the domain-event object 506 indicates that a platform action was performed as described above. As shown in FIG. 5, the digital computing system A provides the domain-event object 506 to the multi-platform data stream 502.

Then, as shown in FIG. 5, the digital computing system B identifies that a domain-event object N matches domain-event-listener rules corresponding to the digital computing system B within the multi-platform data stream 502. Based on identifying the domain-event object N (that indicates the platform action from the digital computing system A), the digital computing system B performs a platform action in act 508. Indeed, the platform action in the act 508 is in response to the domain-event object N. Furthermore, as shown in FIG. 5, the digital computing system B generates and provides a domain-event object 510 upon performing the platform action in the act 508. For instance, the domain-event object 510 indicates that a platform action was performed by the digital computing system B. Lastly, as shown in FIG. 5, the digital computing system B provides the domain-event object 510 to the multi-platform data stream 502.

In one or more embodiments, the digital computing systems A and B continuously identify domain-event objects in the multi-platform data stream 502, perform platform actions, and provide domain-event objects for those platform actions such that the multiple digital computing systems A and B can perform dynamic actions that account for actions in other systems. Although FIG. 5 illustrates two digital computing systems, the digital analytics system 104 can utilize domain-event objects to communicate with various numbers of platforms or systems (or to communicate between various platforms or systems) to perform platform actions in accordance with one or more embodiments herein. Indeed, the various digital computing systems can utilize the domain-event objects and multi-platform data stream to take a various combination of actions that account for and utilize actions taken in other platform systems.

To illustrate, in some instances, the digital analytics system 104 can receive a digital survey response from a respondent device. Upon receiving the digital survey response, the digital analytics system 104 can generate a domain-event object to indicate that a digital survey response has been received and provide the domain-event object into a multi-platform data stream. Then, a digital computing system that manages technical support tickets may identify the domain-event object of the survey response and analyze the survey response referenced in the domain-event object to identify that a technical support issue was mentioned in the survey response. Subsequently, the digital computing system that manages technical support tickets can generate a support ticket for the user corresponding to the survey response. Additionally, in some cases, another digital computing system that manages electronic communications may also identify the same domain-event object. Upon identifying the domain-event object, the digital computing system that manages electronic communications can transmit an electronic communication to an administrator device to provide the digital survey response content (from the domain-event object) to the administrator device. In some embodiments, both the digital computing systems for managing technical support tickets and electronic communications also generate domain-event object based on their respective platform actions.

As another example, a first digital computing system (e.g., the digital analytics system 104) can track and generate user experience statistics on a graphical user interface (e.g., a reporting user interface). In the example, the user experience statistics can be categorized by the type of operating software is utilized in user computing devices. A second digital computing system (e.g., using a third-party platform) may handle the operating software on user computing devices. The second digital computing system can complete software updates on the user computing devices and generate domain-event objects to indicate the software updates. These domain-event objects can be identified by the first digital computing system and utilized to determine which user computing devices have updated software. As a result, the first digital computing system can recategorize the user experience statistics experienced within different operating software versions within its reporting user interface based on the changes identified from the domain-event objects that were created by the second digital computing system.

Additionally, as another example, a first digital computing system within the digital analytics system 104 can receive updates to user settings and/or account information. Then, the first digital computing system can generate a domain-event object to indicate the updates to user settings and/or account information. Subsequently, one or more other digital computing systems can identify the domain-event object and, in response, can trigger a platform process to reflect user settings and/or account information within their storage to reflect the updated user settings and/or account information from the digital computing system that transmitted the domain-event object.

Furthermore, as another example, a first digital computing system (e.g., the digital analytics system 104) can receive data for a creation of a new user account (e.g., a new employee or customer) within a user account management platform. Subsequently, the first digital computing system can generate a domain-event object to indicate the creation of the new user account. Moreover, one or more other digital computing systems can identify the domain-event object and, in response, can trigger a platform action to schedule and/or transmit a digital survey to the user account (e.g., via email, instant message).

In addition, as another example, a first digital computing system can receive a data indication that a marketing email was opened by a user corresponding to a user account. In response, the first digital computing system can generate a domain-event object to indicate a computing device associated with the user account viewed the marketing email. In turn, one or more other digital computing systems can identify the domain-event object and, in response, trigger a platform action to update metadata records for the user account to indicate the user's interest in the content (e.g., a product, a service, an event) presented within the marketing email.

Moreover, as an additional example, a first digital computing system can receive a completed digital survey with a digital survey score. Furthermore, the first digital computing system can generate a domain event object that indicates the completion of the digital survey and includes the digital survey score. One or more other digital computing systems can identify the domain-event object and analyze the digital survey score. For example, the one or more other digital computing systems can analyze the digital survey score from the domain-event object and determine that the digital survey indicates a negative experience (e.g., the score does not satisfy a threshold score). Upon determining that the completed digital survey from the domain-event object constitutes a negative experience, the one or more other computing systems can configure a ticket (e.g., as a to-do task, email event, scheduled electronic meeting) to follow up with a user associated with the user account corresponding to the completed digital survey (e.g., to determine the reasons for the negative experience).

As mentioned above, upon identifying (or receiving) a domain-event object, the digital analytics system 104 can perform a platform action that is a reaction to the domain-event object. In particular, the digital analytics system 104 can perform a platform action reflects (or accounts for) an object event and entity indicated by a domain-event object. Indeed, the digital analytics system 104 (or another digital computing system) can perform various combinations of platform actions. In many cases, the platform actions can be specific to a digital-analytics platform of the digital analytics system 104.

Figure 6:
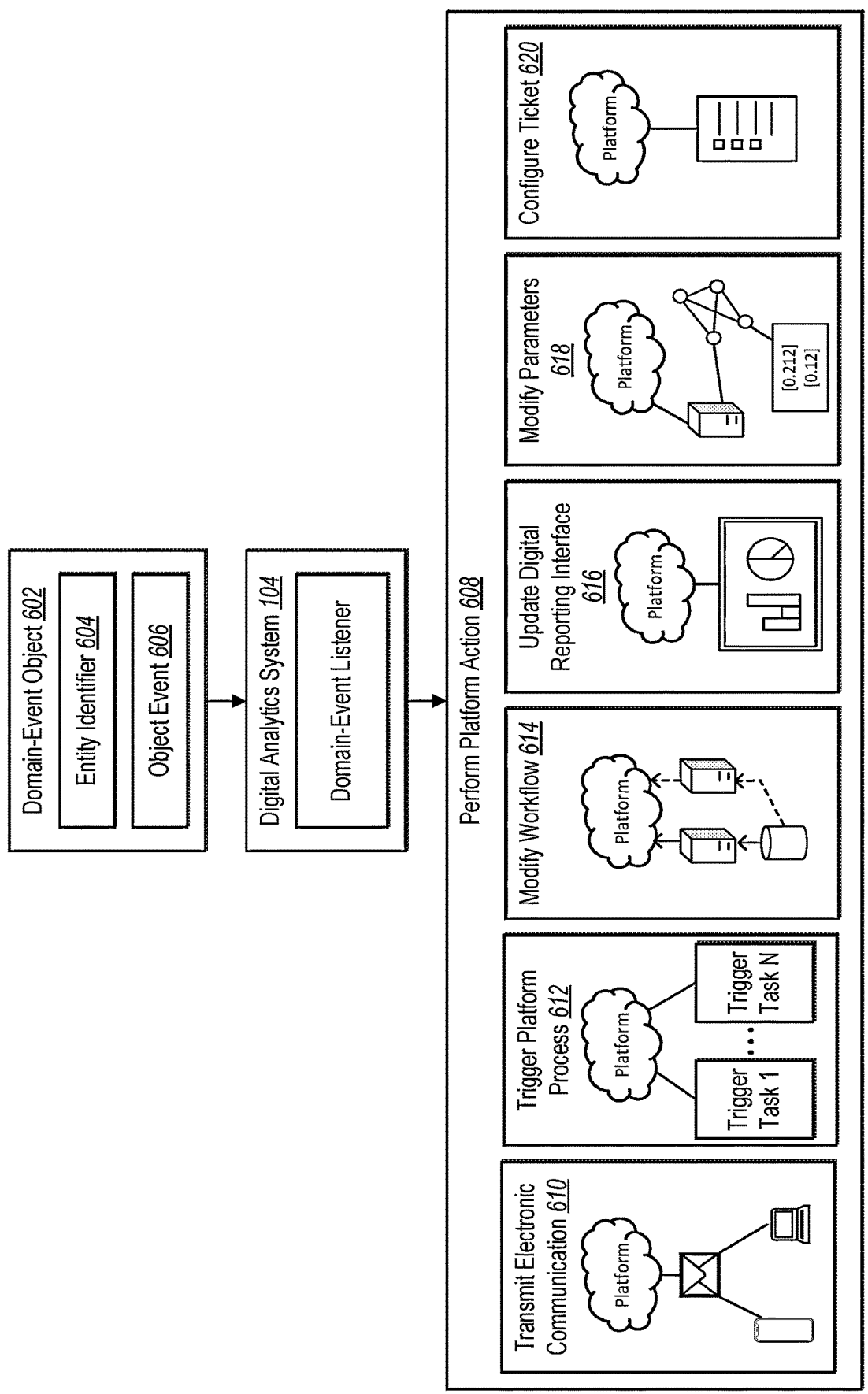
FIG. 6 illustrates a schematic diagram of a digital analytics system performing platform actions in accordance with one or more embodiments.

For example, as shown in FIG. 6, the digital analytics system 104 can perform platform actions, such as, but not limited to, transmitting an electronic communication, configuring a ticket, triggering a platform process, modifying a platform workflow, updating a digital reporting interface, or modifying a platform parameter within the digital-analytics platform to reflect an identified domain-event object. Specifically, as illustrated in FIG. 6, the digital analytics system 104 can identify a domain-event object 602 that includes an entity identifier 604 and an object event 606 (e.g., utilizing a domain-event listener with domain-event-listener rules as described above). Then, as shown in FIG. 6, the digital analytics system 104 can perform a platform action in an act 608 based on the domain-event object 602.

As shown in FIG. 6, the digital analytics system 104 can transmit an electronic communication in an act 610 based on the identified domain-event object 602. For example, the digital analytics system 104 can utilize an identified object event within a domain-event object to transmit an electronic communication reflecting the object event. In some cases, the digital analytics system 104 can transmit an electronic communication (e.g., SMS message, instant message, e-mail, social media posts) to an administrator device that notifies or indicates a user of the object event that has occurred at one or more digital platform applications. Indeed, the digital analytics system 104 can include information corresponding to the domain-event object within the electronic communication. For example, the digital analytics system 104 can auto populate portions of an electronic communication based on a domain-event object as described below (e.g., in relation to FIG. 8A). In addition, the digital analytics system 104 can generate a domain-event object to indicate the transmitted electronic communication.

As further shown in FIG. 6, the digital analytics system 104 can trigger a platform process in an act 612 based on the identified domain-event object 602. For instance, the digital analytics system 104 can initiate a process task within one or more platforms based on identifying the domain-event object. In some embodiments, the digital analytics system 104 triggers a process task in response to identifying a domain-event object, such as, but not limited to, compressing data, performing a data backup, importing and/or exporting of data, encrypting data, aggregating digital survey data, initializing a digital survey analysis, or initializing a machine learning model based on the domain-event object. For example, the digital analytics system 104 can utilize information from the object event of the entity and/or a changed state of an entity in relation to the object event to trigger one of the above-mentioned processes. Moreover, the digital analytics system 104 can generate a domain-event object to indicate the triggering of the platform process.

As also illustrated in FIG. 6, the digital analytics system 104 can modify a workflow in an act 614 based on the identified domain-event object 602. For instance, the digital analytics system 104 can modify a workflow by modifying workflows, such as, but not limited to, a network path of one or more data packets, modify a storage location for one or more processes, add or remove data analysis processes between workflows that prepare digital data (e.g., digital survey responses, electronic communications) for a digital reporting user interface. Additionally, the digital analytics system 104 can generate a domain-event object to indicate the workflow modification.

Moreover, as shown in FIG. 6, the digital analytics system 104 can update a digital reporting user interface in an act 616 based on the identified domain-event object 602. In one or more embodiments, the digital analytics system 104 updates (or modifies) a digital reporting user interface based on a domain-event object by utilizing information identified within the domain-event object. For example, the digital analytics system 104 can perform updates, such as, but not limited to, restructuring the location of information within a digital reporting user interface based on the domain-event object, modifying bounds of data in digital charts based on changes identified in domain-event objects, or modifying data categories within a digital reporting user interface based on the domain-event object. In addition, the digital analytics system 104 can generate a domain-event object to indicate the update to the digital reporting user interface.

As further illustrated in FIG. 6, the digital analytics system 104 can modify parameters in an act 618 based on the identified domain-event object 602. For example, the digital analytics system 104 can utilize a domain-event object to modify parameters of various models within the digital analytics system 104. To illustrate, the digital analytics system 104 can modify training and/or tuning parameters of machine learning models that analyze digital surveys and/or digital user experiences based on data changes indicated by domain-event objects (from other systems). The digital analytics system 104 can also modify parameters, such as, but not limited to, parameters that configure data reporting preferences, parameters that control digital survey transmission frequencies, or parameters that control digital response analysis frequencies. Moreover, the digital analytics system 104 can generate a domain-event object to indicate the modified parameters.

Furthermore, as shown in FIG. 6, the digital analytics system 104 can configure a ticket in an act 620 based on the identified domain-event object 602. For instance, in one or more embodiments, the digital analytics system 104 responds to an occurrence from another computing system that is identified in the domain-event object by configuring a ticket that indicates and tracks tasks that need to be performed for the occurrence reflected in the domain-event object. For instance, the digital analytics system 104 can identify a domain-event object that identifies a security breach in a third-party platform (of a third-party computing system) and, in response, the digital analytics system 104 can configure a ticket (e.g., technical support ticket) that identifies the security breach and tasks that need to be completed by a technical support device. Additionally, the digital analytics system 104 can generate a domain-event object to indicate the configured ticket.

In one or more embodiments, the digital analytics system 104 can utilize a domain-event object to notify computing systems of changes to various types of data and also perform platform actions for various types of data. For example, the digital analytics system 104 can utilize domain-event objects to identify (or communicate changes or updates of) data such as, but not limited to, data representing digital surveys, multi-party conversations, digital survey invitations, digital impressions, digital survey assessments, dashboards, reports, benchmarks, statistical models, topic models, triggers, tasks, workflows, tickets, digital action plans, digital calendar events, and/or machine learning data (e.g., machine learning events, machine learning outputs, automated machine learning tasks, and/or data artifacts). Moreover, the digital analytics system 104 can also utilize domain-event objects to identify (or communicate changes or updates of) data such as, but not limited to, datasets, storage hierarchies, user data, role data, organizational data, directories, segments, mailing lists, profiles, digital reward accounts, touchpoints, programs, projects, templates, libraries, notifications, and electronic messages.

Additionally, the digital analytics system 104 can also perform platform actions that utilize third-party platforms. For instance, the digital analytics system 104 can perform a platform action that initiates or utilizes an API call or plugin from a third-party platform. To illustrate, the digital analytics system 104 can transmit an electronic communication through a third-party application that shares communication to the administrator device or a plurality of computing devices. Moreover, the digital analytics system 104 can perform a platform action that initiates or utilizes an API call or plugin to generate reports from data provided by the digital analytics system 104. Indeed, adding platform actions for third-party platforms to pair with domain-event-listener rules is described in greater detail below (e.g., in relation to FIGS. 7A-7C).

Furthermore, in some embodiments, the digital analytics system 104 perform multiple platform actions (e.g., a chain of platform actions) based on identifying a domain-event object. To illustrate, the domain-event object can include a pairing between domain-event-listener rules and multiple platform action selections. In such a case, the digital analytics system 104 can perform each of the platform actions associated with identifying a domain-event object. For example, the digital analytics system 104 can transmit an electronic message, update a digital reporting user interface, and modify parameters upon identifying a single domain-event object.

As mentioned above, the digital analytics system 104 can provide, for display within a graphical user interface, selectable options to select domain-event-listener conditions and platform action pairings. In addition, the digital analytics system 104 can also provide, for display within a graphical user interface, selectable options to select platform actions that utilize third-party platforms. For example, FIGS. 7A-7C illustrate the digital analytics system 104 providing, for display within a graphical user interface, selectable options to select platform actions that utilize third-party platforms in connection to domain-event-listener conditions.

Figure 7A:
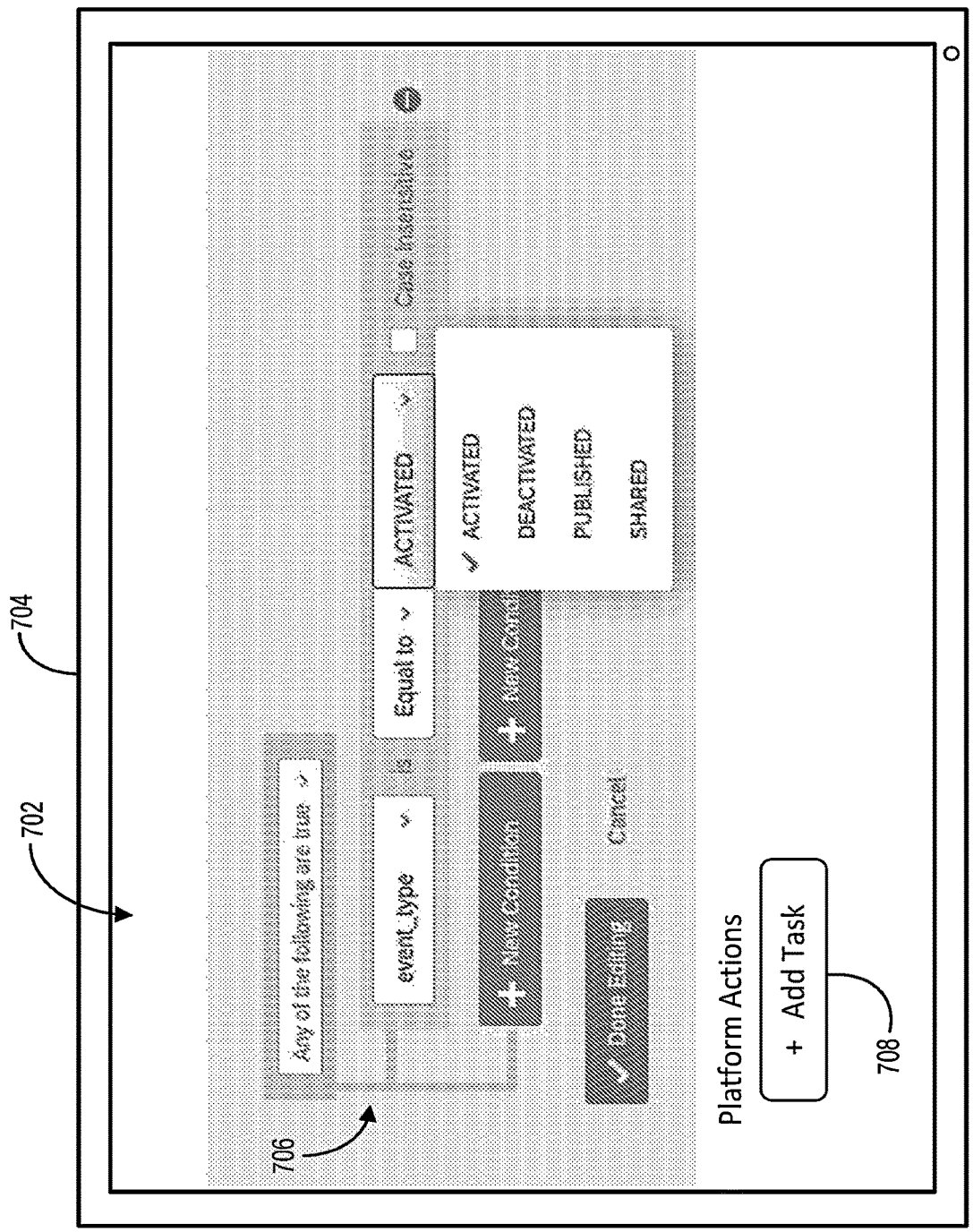
FIGS. 7A-7C illustrate graphical user interfaces for selecting domain-event-listener conditions and platform actions in accordance with one or more embodiments.

For instance, as shown in FIG. 7A, the digital analytics system 104 provides, for display within a graphical user interface 702 of an administrator device 704, selectable domain-event-listener conditions 706 and a platform-action option 708 (as described above in relation to FIG. 4). Upon receiving an indication of a selection of the platform-actions option 708, the digital analytics system 104 can provide, for display within an application selection graphical user interface, options to select a platform action application (e.g., a third-party application or an internal application) to perform the platform action. Indeed, FIG. 7B illustrates the digital analytics system 104, providing application options 710 to select a platform action application for display within an application selection graphical user interface 711 in response to receiving a request to add a platform action to one or more domain-event-listener conditions (within the administrator device 704).

Figure 7B:
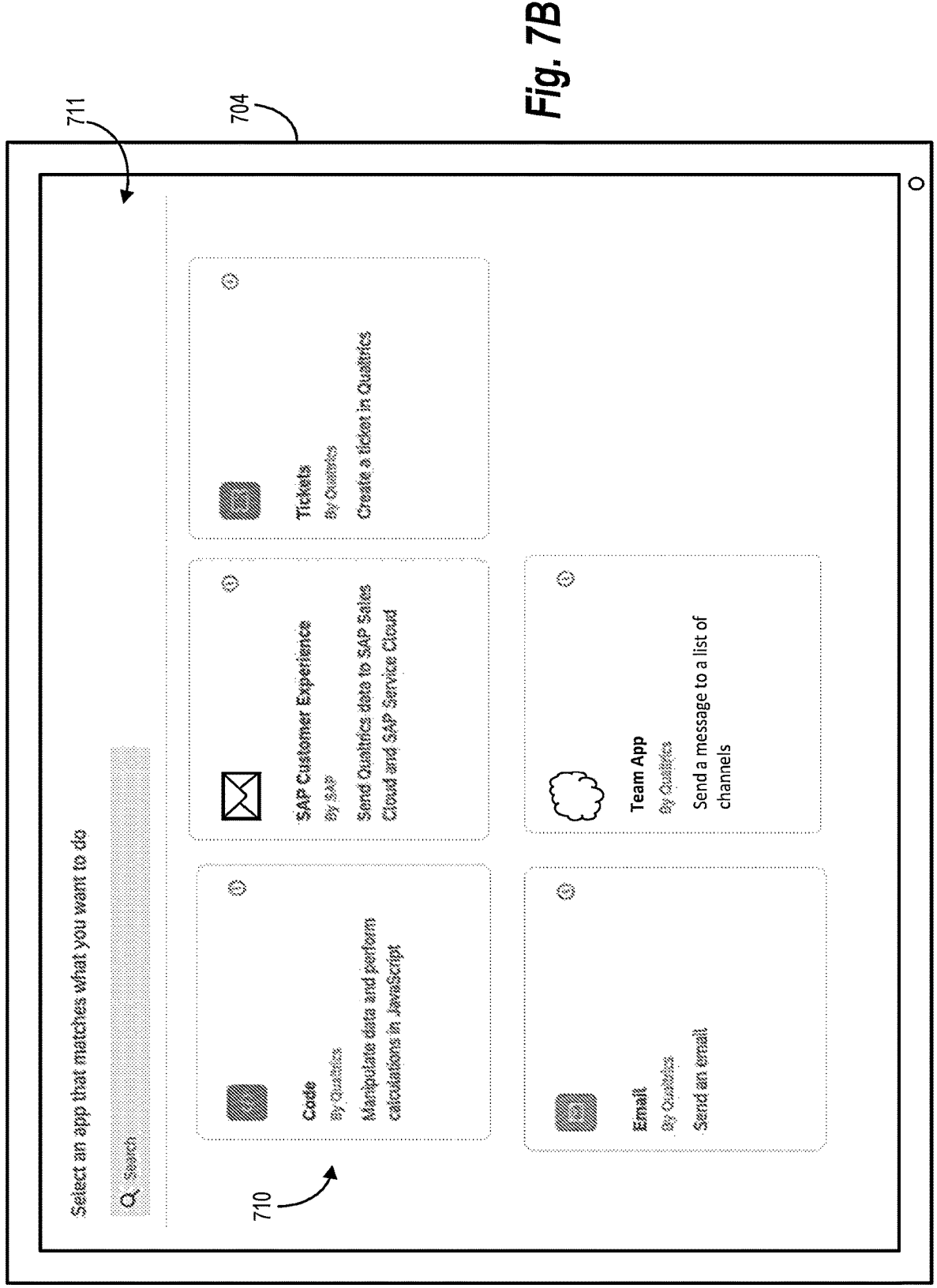

As shown in FIG. 7B, the digital analytics system 104 can provide the application options 710 to select platform actions and an accompanying third-party application to perform that platform action from the application selection graphical user interface 711. Indeed, the digital analytics system 104 can utilize the selected platform action by requesting (or initiating) a third-party platform application to perform the platform action when a domain-event object that satisfies selected domain-event-listener rules is detected. Furthermore, the digital analytics system 104 can utilize (or provide) a wide variety of platform actions from third-party platform sources for selection in connection to domain-event-listener rules.

Figure 7C:
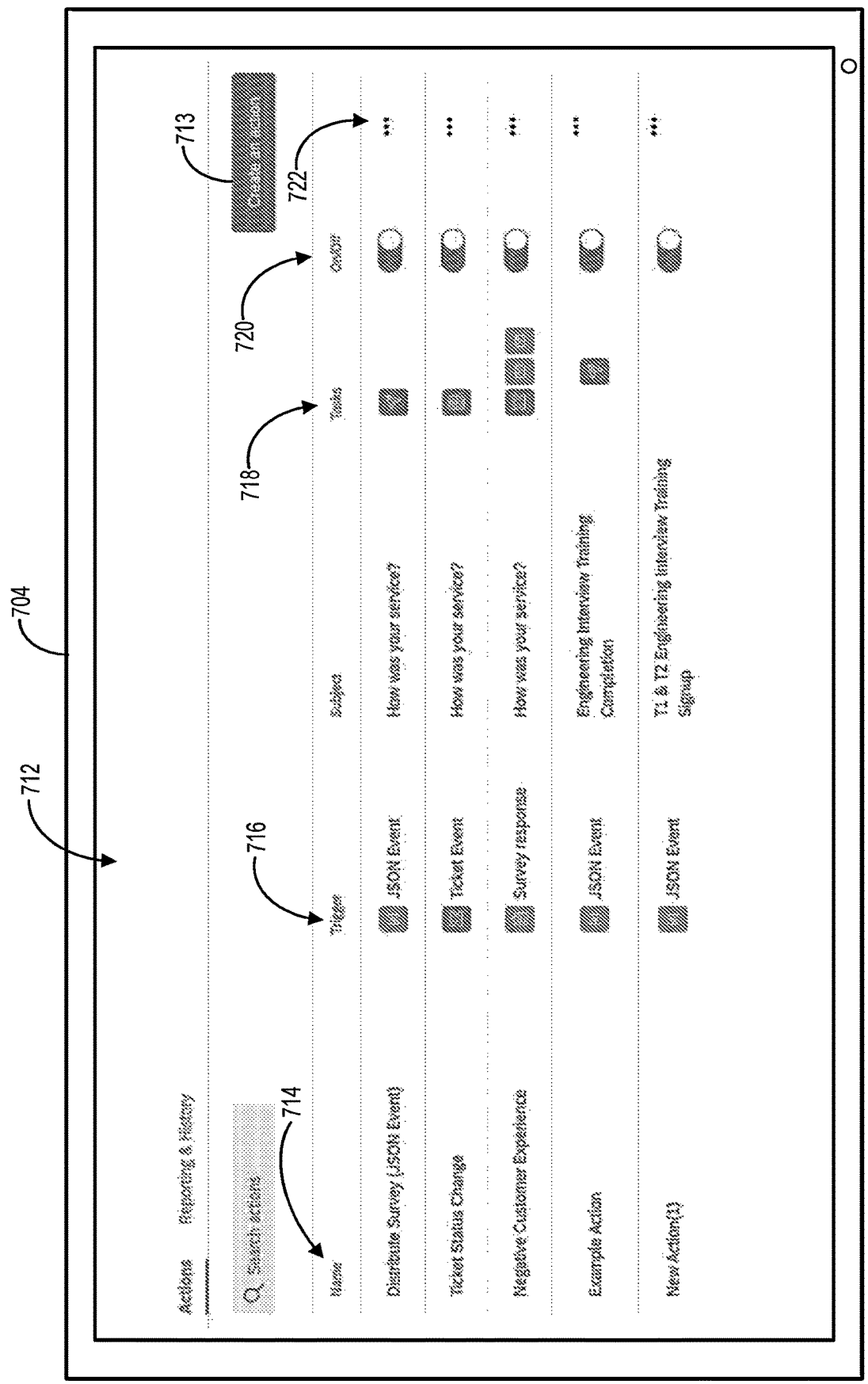

Furthermore, as shown in FIG. 7C, the digital analytics system 104 also provides, for display within a graphical user interface 712 of the administrator device 704, a list of created domain-event object listeners and platform actions with options to activate or deactivate the domain-event object listeners (e.g., toggle button for on or off). In particular, as shown in FIG. 7C, the digital analytics system 104 provides, for display within a graphical user interface 712, domain-event-object-listener-action-pair names 714, the type of domain-event object that is being tracked in a trigger column 716, and the type of platform action that will be performed upon detecting a domain-event object in a task column 718.

As illustrated in FIG. 7C, the digital analytics system 104 provides, for display within the graphical user interface 712, a selectable option 713 to create a new platform action. Indeed, upon indication of a selection of the selectable option 713, the digital analytics system 104 can provide, for display within a graphical user interface, selectable options to generate a domain-event-object listener and corresponding platform actions. More specifically, the digital analytics system 104 can provide, for display within a graphical user interface, selectable options to select one or more domain-event-listener conditions and corresponding platform actions in accordance with one or more embodiments.

Additionally, as shown in FIG. 7C, the digital analytics system 104 provides, for display within the graphical user interface 712, a selectable option 720 to toggle domain-event-object listener and platform action pairings. Indeed, upon receiving an indication of a selection of the selectable option 720, the digital analytics system 104 can activate and/or deactivate a particular domain-event listener and its corresponding platform action(s). Additionally, the digital analytics system 104 also provides, for display within the graphical user interface 712, a selectable option 722 to modify a particular domain-event listener and its corresponding platform action(s). For example, upon receiving an indication of a selection of the selectable option 722, the digital analytics system 104 can provide options to select additional domain-event-listener conditions, remove domain-event-listener conditions, modify domain-event-listener conditions, add platform actions, remove platform actions, or modify platform actions in accordance with one or more embodiments.

Figure 8A:
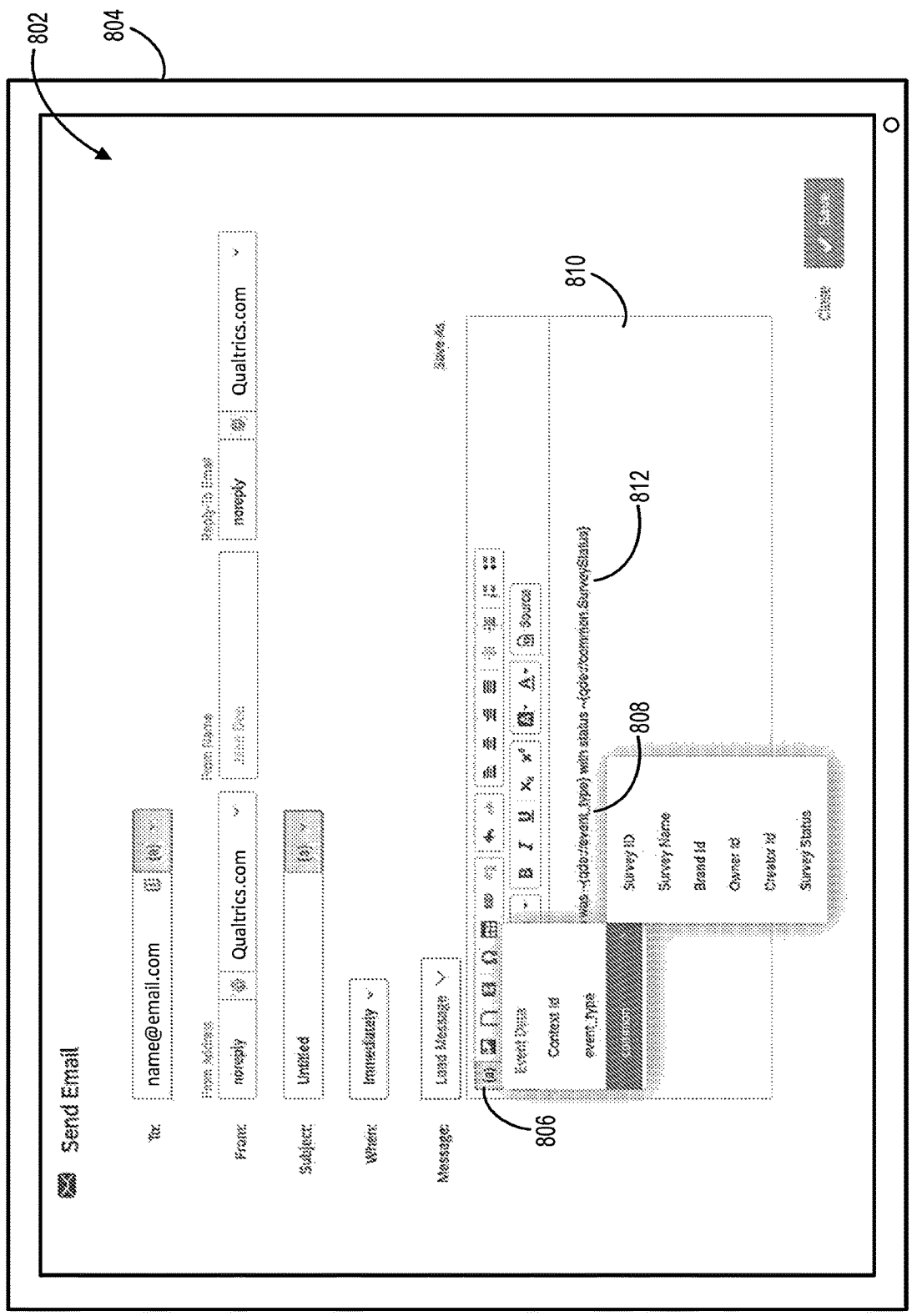
FIGS. 8A and 8B illustrate graphical user interfaces for utilizing domain-event object references in platform action templates in accordance with one or more embodiments.

In some embodiments, the digital analytics system 104 provides, for display within a graphical user interface, platform action setup options (e.g., within templates) that include fields that auto populate utilizing domain-event objects. For example, FIG. 8A illustrates the digital analytics system 104 providing, for display within a graphical user interface 802 of an administrator device 804, platform action setup options for an electronic communication transmittal action. In particular, FIG. 8A illustrates the digital analytics system 104 providing, for display within the graphical user interface 802 of the administrator device 804, platform action setup options to configure an e-mail task for a domain-event object.

As shown in FIG. 8A, the digital analytics system 104 can provide reference options that provide pointers to attribute information for a target domain-event object. Indeed, the digital analytics system 104 can generate pointers to information concerning a target domain-event object by inserting a domain-event object reference 808 within a text body 810 of an e-mail. For example, as shown in FIG. 8A, the digital analytics system 104 can insert a domain-event object reference 808 to replace text within the text body 810 with an object-event type associated with a domain-event object that triggers the e-mail platform action (e.g., upon receiving an indication of an interaction with a domain-event object reference selector 806).

As also shown in FIG. 8A, the digital analytics system 104 can insert a domain-event object reference 812 to replace text within the text body 810 with a status corresponding to the domain-event object. Indeed, the digital analytics system 104 can utilize various attribute types or data from a domain-event object (in accordance with one or more embodiments) within the domain-event object reference pointers (e.g., by utilizing a dropdown list and/or a radio button list of domain-event object data types).

Figure 8B:
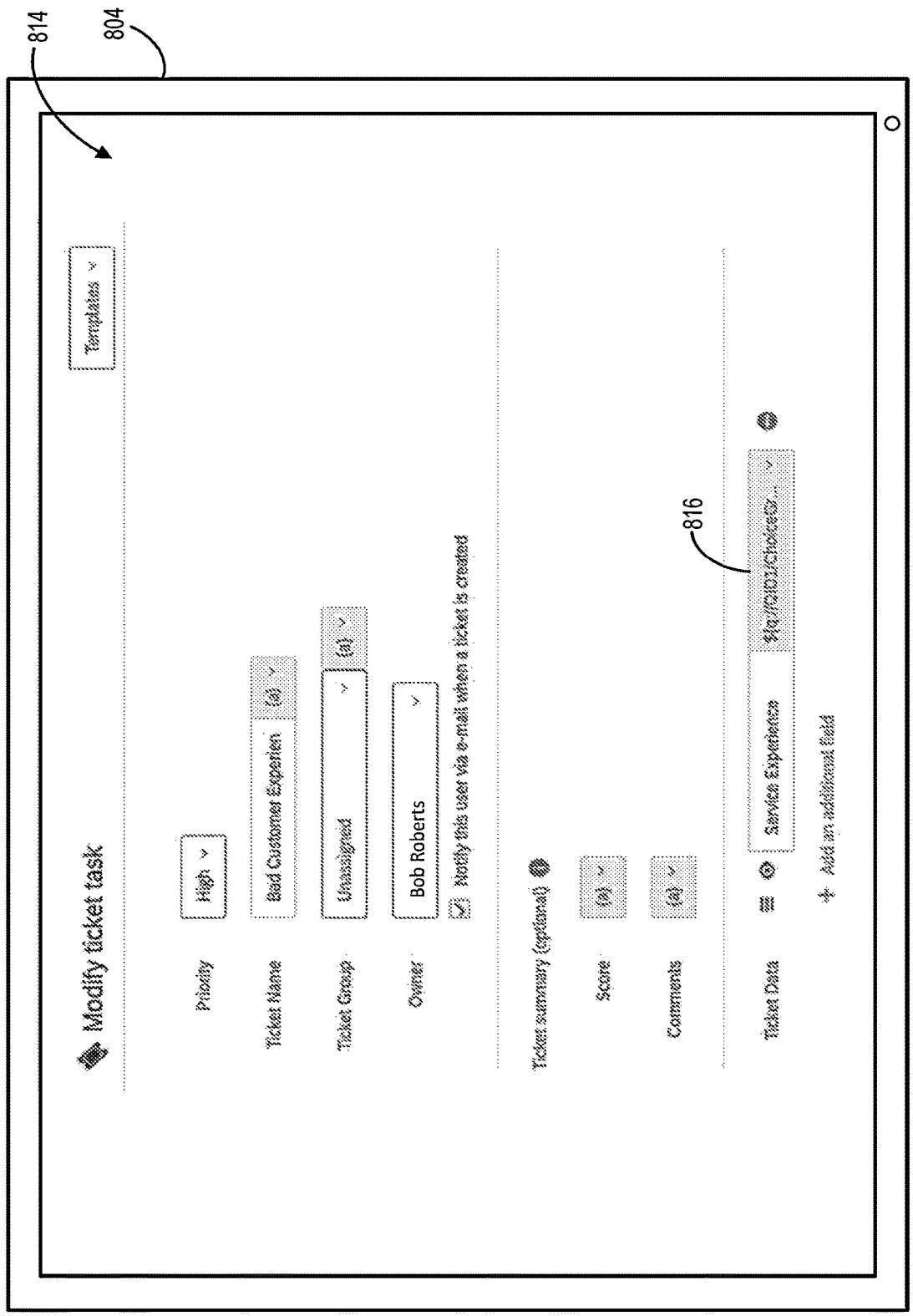

As another example, FIG. 8B illustrates the digital analytics system 104 providing, for display within a graphical user interface 814 of the administrator device 804, platform action setup options (e.g., within templates) for configuring a ticket based on a domain-event object. In particular, as shown in FIG. 8B, the digital analytics system 104 can also provide, for display within the graphical user interface 814, fields that include selectable options to auto populate data with information from a target domain-event object within a configurable ticket. Indeed, as illustrated in FIG. 8B, the digital analytics system 104 can insert a domain-event object reference 816 within data fields of a configurable ticket such that the domain-event object reference 816 is replaced with information from a corresponding domain-event object (e.g., a service experience referenced within the domain-event object).

Although FIGS. 8A and 8B illustrate the digital analytics system 104 utilizing an e-mail setup and a ticket configuration setup as the platform action, in some embodiments, the digital analytics system 104 utilizes various attribute types or data from a domain-event object (as described above) within the domain-event object reference pointers in setup options for various other platform actions.

Additionally, although FIGS. 7A-7C and 8A-8B illustrate one or more embodiments of a graphical user interface, the digital analytics system 104 can provide a graphical user interface (for display on a computing device) that includes various user interface attributes. For example, the digital analytics system 104 can provide a graphical user interface that includes various filtering, merging, and/or joining options for the domain-event-object listener conditions and/or platform actions. In some cases, the digital analytics system 104 can provide a graphical user interface that includes color-based or other visual updates to the graphical user interface for the selectable options corresponding to the domain-event-object listener conditions and/or platform actions. Moreover, the digital analytics system 104 can provide user interface elements, such as, but not limited to, drop down elements, graphs, tables, charts, sliding tools, text input elements, radio buttons, or other user interface controls for the selectable options corresponding to the domain-event-object listener conditions and/or platform actions. Additionally, in some embodiments, the digital analytics system 104 can also provide selectable options within a graphical user interface based on various user roles, user permissions, and/or product features corresponding to an administrator device (or user account).

Figure 9:
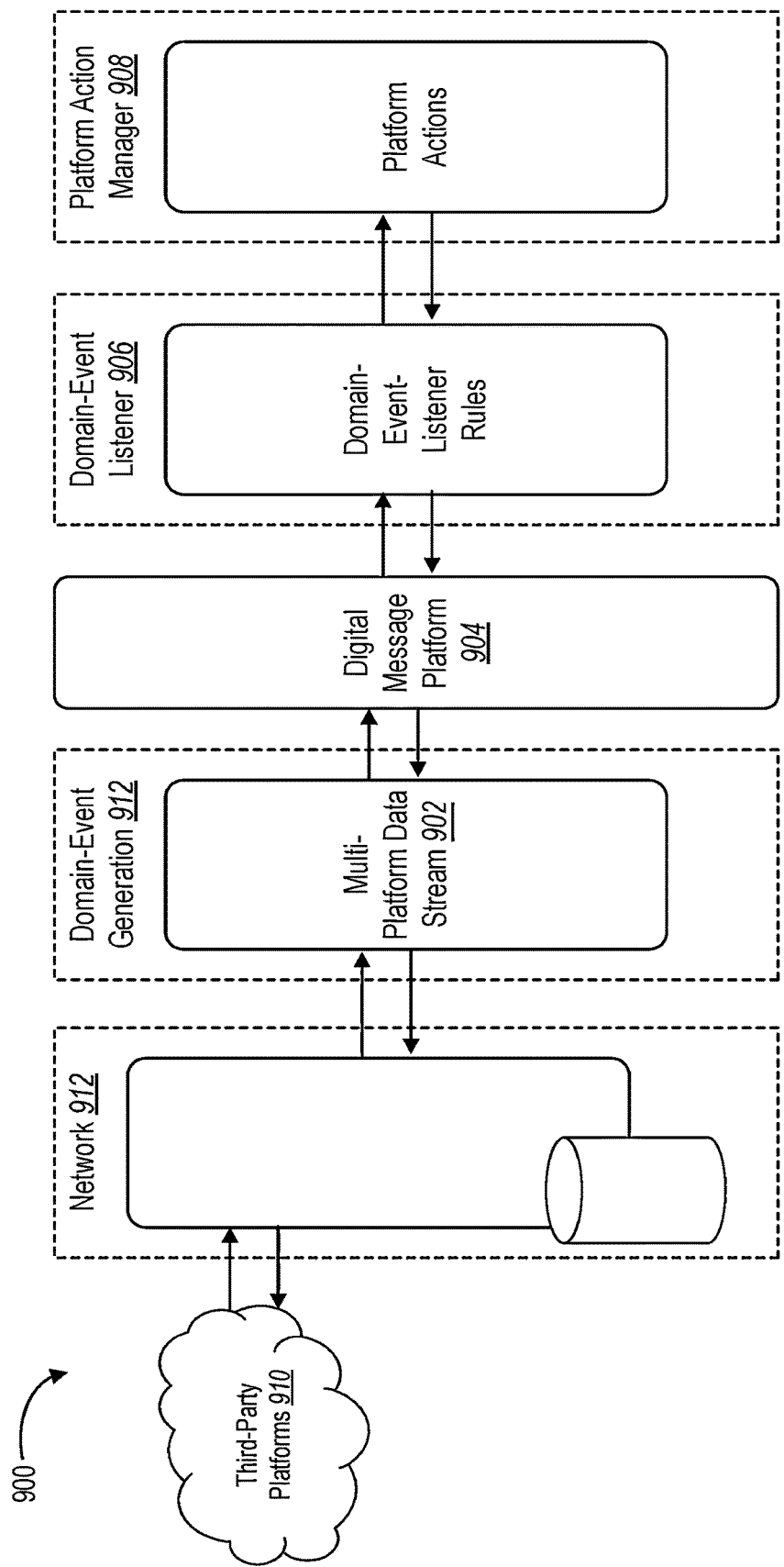
FIG. 9 illustrates a schematic diagram of an environment in which a digital analytics system can operate in accordance with one or more embodiments.

Turning now to FIG. 9, additional detail will be provided regarding components and capabilities of one or more implementations of the digital analytics system 104. In particular, FIG. 9 illustrates an example environment 900 in which the digital analytics system 104 is executed. As shown by the implementation of FIG. 9, the environment 900 includes or hosts multi-platform data stream 902, a digital message platform 904, a domain-event listener 906, a platform actions manager 908, third-party platforms 910, and a network 912.

As just mentioned, and as illustrated in the implementation of FIG. 9, the environment 900 includes the multi-platform data stream 902 and the digital message platform 904. For example, the multi-platform data stream 902 can facilitate the receiving, storage, and/or transmission of domain-event objects between internal platform systems of the digital analytics system 104 and/or domain-event objects from third-party platforms 910 as described above (e.g., in relation to FIGS. 1, 2, and 3). In addition, the digital message platform 904 can receive, store, and/or transmit domain-event objects between internal platform systems of the digital analytics system 104 as described above (e.g., in relation to FIGS. 1, 2, and 3).

Furthermore, as illustrated in the implementation of FIG. 9, the environment 900 includes the domain-event listener 906. The domain-event listener 906 can detect domain-event objects within the digital message platform 904 (or the multi-platform data stream 902) and check the domain-event objects against sets of domain-event listener rules as described above (e.g., in relation to FIGS. 2-5). Upon identifying a domain-event object that satisfies a set of domain-event listener rules, the domain-event listener 906 provides the identified domain-event object to the platform action manager 908 as described above (e.g., in relation to FIGS. 2-5). The domain-event listener 906 can listen for domain-event objects from both internal platforms and/or third-party platforms 910 in the multi-platform data stream 902 and/or the digital message platform 904 as described above (e.g., in relation to FIGS. 1-5).

As further illustrated in FIG. 9, the environment 900 includes the platform action manager 908. Indeed, the platform action manager 908 can receive domain-event objects and identify information corresponding to the domain-event objects (e.g., entity identifiers, object events) as described above (e.g., in relation to FIGS. 2 and 5-6). Furthermore, the platform action manager 908 can perform a platform action that reflects the domain-event object identified by the domain-event listener 906 as described above (e.g., in relation to FIGS. 2 and 5-6). In particular, the platform action manager 908 can perform platform actions, such as, but not limited to, transmitting an electronic communication, configuring a ticket, triggering a platform process, modifying a platform workflow, updating a digital reporting interface, or modifying a platform parameter within the digital-analytics platform to reflect an identified domain-event object as described above (e.g., in relation to FIGS. 2 and 5-6). Furthermore, the platform action manager 908 can generate and transmit a domain-event object for the platform action to the multi-platform data stream 902 and/or the digital message platform 904 as described above (e.g., in relation to FIGS. 2 and 5-6).

Moreover, as illustrated in the implementation of FIG. 9, the environment 900 includes the third-party platforms 910. For example, the third-party platforms 910 can communicate with components of the digital analytics system 104 through the multi-platform data stream 902 and/or the digital message platform 904 via a network 912 (e.g., a network as described in FIG. 1). Indeed, the third-party platforms 910 can include domain-event listeners to listen for domain-event objects in the multi-platform data stream 902 and/or the digital message platform 904 and perform platform actions based on identified domain-event objects as described above (e.g., in relation to FIGS. 2-6). Moreover, computing systems for the third-party platforms 910 can transmit domain-event objects to the multi-platform data stream 902 and/or the digital message platform 904 such that the domain-event listener 906 and the platform action manager 908 can react to the third-party platform domain-event objects as described above (e.g., in relation to FIGS. 2 and 5-6).

Figure 10:
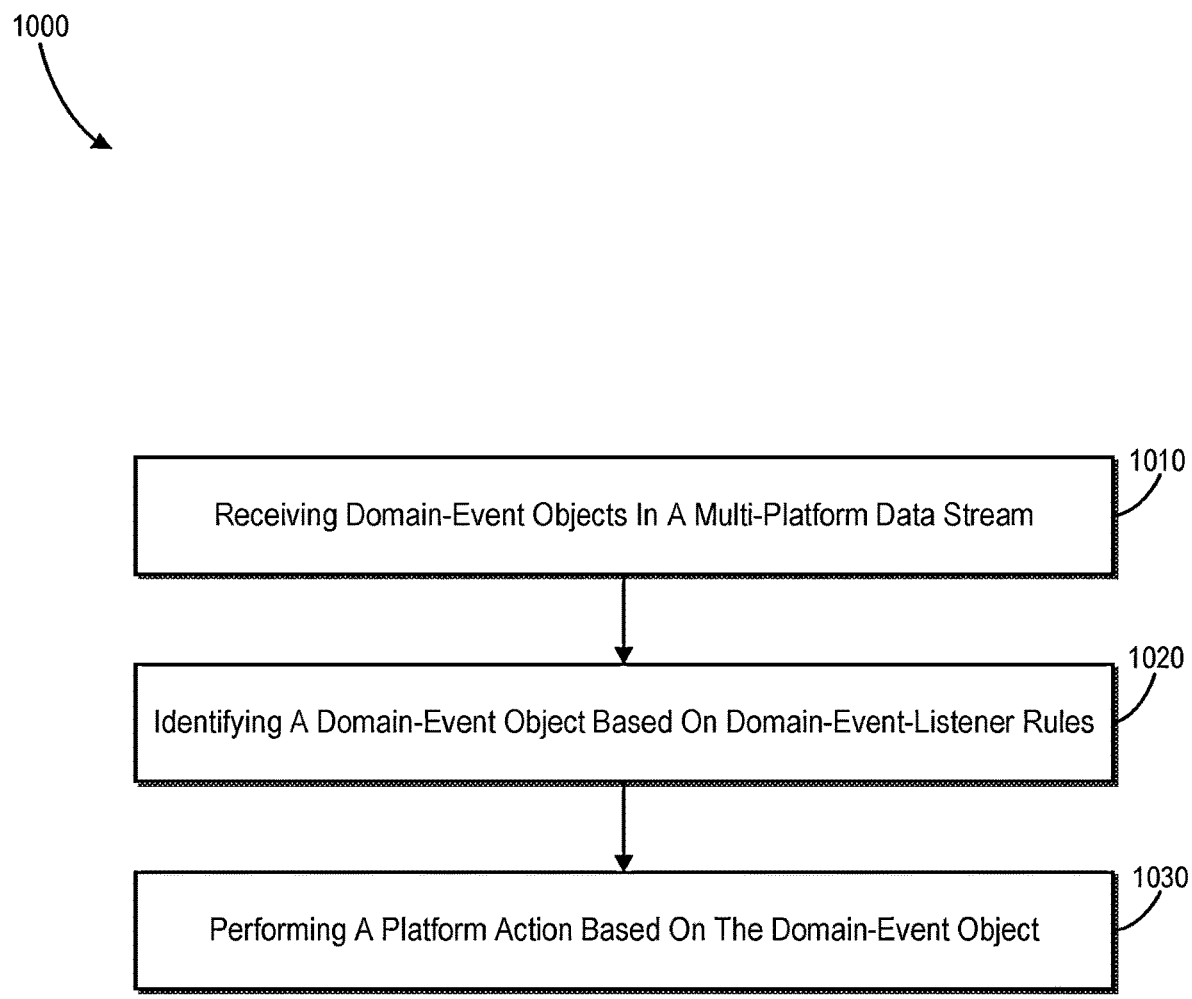
FIG. 10 illustrates a flowchart of a series of acts for identifying a domain-event object from a multi-platform data stream and performing a platform action based on the identified domain-event object in accordance with one or more embodiments.

Turning now to FIG. 10, this figure illustrates a flowchart of a series of acts 1000 of performing platform actions utilizing domain-event objects in accordance with one or more embodiments. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer readable storage medium can comprise instructions that, when executed by one or more processors, cause a computing device to perform the acts depicted in FIG. 10. In still further embodiments, a system can perform the acts of FIG. 10.

As shown in FIG. 10, the acts 1000 include an act 1010 of receiving domain-event objects in a multi-platform data stream. In particular, the act 1010 can include receiving, within a multi-platform data stream, a set of domain-event objects. For example, a domain-event object can include an entity identifier and object event. Furthermore, the act 1010 can include identifying, from a schema library for a multi-platform data stream, a domain-event object schema for a domain-event object to access domain-event-listener conditions corresponding to the domain-event object. In addition, the act 1010 can include generating a new domain-event object, generating a domain-event schema for the new domain-event object having domain-event-listener conditions to identify the new domain-event object within a multi-platform data stream, and providing the domain-event object schema to a schema library for the multi-platform data stream.

As further shown in FIG. 10, the acts 1000 include an act 1020 of identifying a domain-event object based on domain-event-listener rules. In particular, the act 1020 can include identifying, from a set of domain-event objects, a domain-event object based on an entity identifier for the domain-event object satisfying a set of domain-event-listener rules for a digital-analytics platform. Furthermore, the act 1020 can include determining that an entity identifier satisfies a given domain-event-listener rule from a set of domain-event-listener rules by determining that the entity identifier satisfies a logic condition for a type of digital entity, a digital-entity-creation time, an object-event-occurrence time, or an object-event type. In addition, the act 1020 can include accessing content corresponding to an entity identifier and an object event of a domain-event object by utilizing the entity identifier as a reference.

Furthermore, the act 1020 can include identifying an object event for a domain-event object. For example, identifying an object event can include identifying a creation of, an assignment of, a transmission of, a modification to, an interaction with, a publication of, an update of, a sharing of, a subscription to, an unsubscription to, or a rejection of a digital entity corresponding to an entity identifier. Furthermore, a digital entity can include a contact, a form, a ticket, a response, a distribution, a survey invitation, a list member, or a segment member. In addition, the act 1020 can include determining that an identified domain-event object corresponds to a third-party platform differing from a digital-analytics platform.

Additionally, the act 1020 can include providing, for display within a graphical user interface of an administrator device, a selectable domain-event-listener condition in relation to an entity identifier of a domain-event object. Moreover, the act 1020 can include receiving, from an administrator device, an indication of a selection of a selectable domain-event-listener condition and, based on the selection of the selectable domain-event-listener condition, adding the selectable domain-event-listener condition as a domain-event-listener rule to a set of domain-event-listener rules. Furthermore, the act 1020 can include providing, for display within a graphical user interface of an administrator device, a platform-action option for a platform action to be performed upon satisfaction of a domain-event-listener condition. In addition, the act 1020 can include receiving, from an administrator device, an indication of a selection of a platform-action option and, based on a selection of the platform-action option, associating the platform action with a set of domain-event-listener rules such that the platform action is performed upon satisfying a domain-event-listener condition.

As further shown in FIG. 10, the acts 1000 include an act 1030 of performing a platform action based on the domain-event object. In particular, the act 1030 can include performing a platform action within a digital-analytics platform based on an entity identifier and an object event for a domain-event object. For example, a platform action can include transmitting an electronic communication, configuring a ticket, triggering a platform process, modifying a platform workflow, updating a digital reporting interface, or modifying a platform parameter within a digital-analytics platform to reflect an identified domain-event object. Furthermore, the act 1030 can include performing a platform action within a digital-analytics platform in response to a third-party platform action taken on a third-party platform as indicated by an identified domain-event object.

Moreover, the act 1030 can include, in response to performing a platform action, generating an additional domain-event object comprising an additional entity identifier and an additional object event corresponding to the platform action. In addition, the act 1030 can include providing an additional domain-event object to a multi-platform data stream. In some instances, the act 1030 can include identifying an additional platform action corresponding to an additional platform taken in response to a domain-event object.

Embodiments of the present disclosure may comprise or utilize a special-purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

Figure 11:
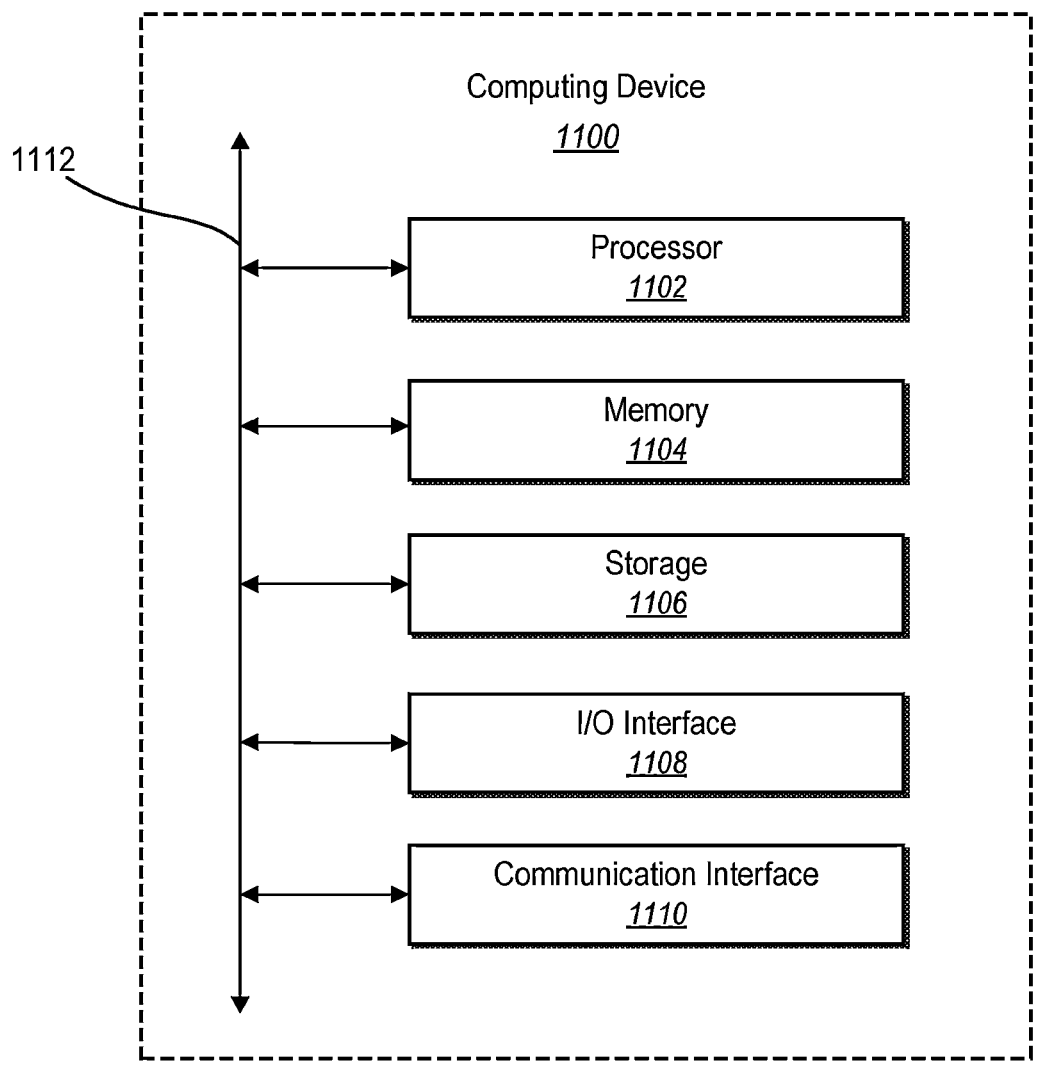
FIG. 11 illustrates a block diagram of a computing device in accordance with one or more embodiments.

FIG. 11 illustrates a block diagram of an exemplary computing device 1100 that may be configured to perform one or more of the processes described above. One will appreciate that one or more computing devices such as the computing device 1100 may implement the administrator device 112 (as a client device), the respondent devices 110a-110n, the server device(s) 102, and/or other devices described above in connection with FIG. 1. As shown by FIG. 11, the computing device 1100 can comprise a processor 1102, a memory 1104, a storage device 1106, an I/O interface 1108, and a communication interface 1110, which may be communicatively coupled by way of a communication infrastructure 1112. While the exemplary computing device 1100 is shown in FIG. 11, the components illustrated in FIG. 11 are not intended to be limiting. Additional or alternative components may be used in other embodiments. Furthermore, in certain embodiments, the computing device 1100 can include fewer components than those shown in FIG. 11. Components of the computing device 1100 shown in FIG. 11 will now be described in additional detail.

In one or more embodiments, the processor 1102 includes hardware for executing instructions, such as those making up a computer program. As an example and not by way of limitation, to execute instructions, the processor 1102 may retrieve (or fetch) the instructions from an internal register, an internal cache, the memory 1104, or the storage device 1106 and decode and execute them. In one or more embodiments, the processor 1102 may include one or more internal caches for data, instructions, or addresses. As an example and not by way of limitation, the processor 1102 may include one or more instruction caches, one or more data caches, and one or more translation lookaside buffers ("TLBs"). Instructions in the instruction caches may be copies of instructions in the memory 1104 or the storage device 1106.

The memory 1104 may be used for storing data, metadata, and programs for execution by the processor(s). The memory 1104 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1104 may be internal or distributed memory.

The storage device 1106 includes storage for storing data or instructions. As an example and not by way of limitation, storage device 1106 can comprise a non-transitory storage medium described above. The storage device 1106 may include a hard disk drive ("HDD"), a floppy disk drive, flash memory, an optical disc, a magneto-optical disc, magnetic tape, or a Universal Serial Bus ("USB") drive or a combination of two or more of these. The storage device 1106 may include removable or non-removable (or fixed) media, where appropriate. The storage device 1106 may be internal or external to the computing device 1100. In one or more embodiments, the storage device 1106 is non-volatile, solid-state memory. In other embodiments, the storage device 1106 includes read-only memory ("ROM"). Where appropriate, this ROM may be mask programmed ROM, programmable ROM ("PROM"), erasable PROM ("EPROM"), electrically erasable PROM ("EEPROM"), electrically alterable ROM ("EAROM"), or flash memory or a combination of two or more of these.

The I/O interface 1108 allows a user to provide input to, receive output from, and otherwise transfer data to and receive data from the computing device 1100. The I/O interface 1108 may include a mouse, a keypad or a keyboard, a touch screen, a camera, an optical scanner, network interface, modem, other known I/O devices or a combination of such I/O interfaces. The I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1108 is configured to provide graphical data to a display for presentation to a user. The graphical data may be representative of one or more graphical user interfaces and/or any other graphical content as may serve a particular implementation.

The communication interface 1110 can include hardware, software, or both. In any event, the communication interface 1110 can provide one or more interfaces for communication (such as, for example, packet-based communication) between the computing device 1100 and one or more other computing devices or networks. As an example and not by way of limitation, the communication interface 1110 may include a network interface controller ("NIC") or network adapter for communicating with an Ethernet or other wire-based network or a wireless NIC ("WNIC") or wireless adapter for communicating with a wireless network, such as a WI-FI.

Additionally, or alternatively, the communication interface 1110 may facilitate communications with an ad hoc network, a personal area network ("PAN"), a local area network ("LAN"), a wide area network ("WAN"), a metropolitan area network ("MAN"), or one or more portions of the Internet or a combination of two or more of these. One or more portions of one or more of these networks may be wired or wireless. As an example, the communication interface 1110 may facilitate communications with a wireless PAN ("WPAN") (such as, for example, a BLUETOOTH WPAN), a WI-FI network, a WI-MAX network, a cellular telephone network (such as, for example, a Global System for Mobile Communications ("GSM") network), or other suitable wireless network or a combination thereof.

Additionally, the communication interface 1110 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1112 may include hardware, software, or both that couples components of the computing device 1100 to each other. As an example and not by way of limitation, the communication infrastructure 1112 may include an Accelerated Graphics Port ("AGP") or other graphics bus, an Enhanced Industry Standard Architecture ("EISA") bus, a front-side bus ("FSB"), a HYPERTRANSPORT ("HT") interconnect, an Industry Standard Architecture ("ISA") bus, an INFINIBAND interconnect, a low-pin-count ("LPC") bus, a memory bus, a Micro Channel Architecture ("MCA") bus, a Peripheral Component Interconnect ("PCI") bus, a PCI-Express ("PCIe") bus, a serial advanced technology attachment ("SATA") bus, a Video Electronics Standards Association local ("VLB") bus, or another suitable bus or a combination thereof.

Figure 12:
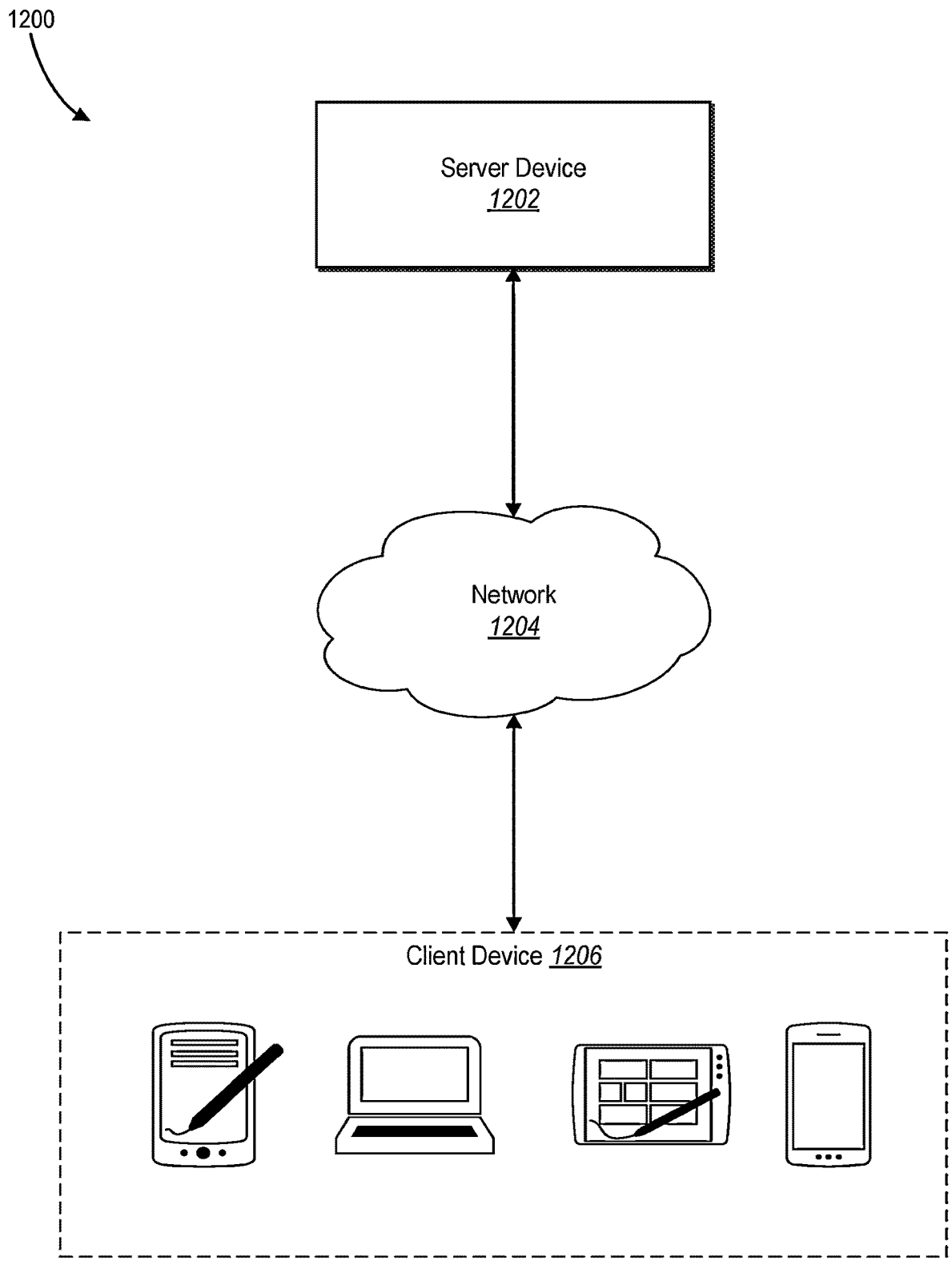
FIG. 12 illustrates a network environment of a digital survey system in accordance with one or more embodiments.

FIG. 12 illustrates an example network environment 1200 of the digital analytics system 104. Network environment 1200 includes a client device 1206, and a server device 1202 connected to each other by a network 1204. Although FIG. 12 illustrates a particular arrangement of client device 1206, server device 1202, and network 1204, this disclosure contemplates any suitable arrangement of client device 1206, server device 1202, and network 1204. As an example and not by way of limitation, two or more of the client devices 1206, and server devices 1202 may be connected to each other directly, bypassing network 1204. As another example, two or more of client devices 1206 and server devices 1202 may be physically or logically co-located with each other in whole, or in part. Moreover, although FIG. 12 illustrates a particular number of client devices 1206, server devices 1202, and networks 1204, this disclosure contemplates any suitable number of client devices 1206, server devices 1202, and networks 1204. As an example and not by way of limitation, network environment 1200 may include multiple client devices 1206, server devices 1202, and networks 1204.

This disclosure contemplates any suitable network 1204. As an example and not by way of limitation, one or more portions of network 1204 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1204 may include one or more networks 1204.

Links may connect client device 1206, and server device 1202 to network 1204 or to each other. This disclosure contemplates any suitable links. In particular embodiments, one or more links include one or more wireline (such as for example Digital Subscriber Line ("DSL") or Data Over Cable Service Interface Specification ("DOCSIS")), wireless (such as for example Wi-Fi or Worldwide Interoperability for Microwave Access ("WiMAX")), or optical (such as for example Synchronous Optical Network (SONET) or Synchronous Digital Hierarchy ("SDH")) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1200. One or more first links may differ in one or more respects from one or more second links.

In particular embodiments, client device 1206 may be an electronic device including hardware, software, or embedded logic components or a combination of two or more such components and capable of carrying out the appropriate functionalities implemented or supported by client device 1206. As an example and not by way of limitation, a client device 1206 may include any of the computing devices discussed above in relation to FIG. 11. A client device 1206 may enable a network user at client device 1206 to access network 1204.

In particular embodiments, client device 1206 may include a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at client device 1206 may enter a Uniform Resource Locator ("URL") or other address directing the web browser to a particular server (such as server, or a server associated with a third-party system), and the web browser may generate a Hyper Text Transfer Protocol ("HTTP") request and communicate the HTTP request to server. The server may accept the HTTP request and communicate to client device 1206 one or more Hyper Text Markup Language ("HTML") files responsive to the HTTP request. Client device 1206 may render a webpage based on the HTML files from the server for presentation to the user. This disclosure contemplates any suitable webpage files. As an example and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, server device 1202 may include a variety of servers, sub-systems, programs, modules, logs, and data stores. In particular embodiments, server device 1202 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Server device 1202 may also include suitable components such as network interfaces, security mechanisms, load balancers, failover servers, management-and-network-operations consoles, other suitable components, or any suitable combination thereof.

In particular embodiments, server device 1202 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. Additionally, a user profile may include financial and billing information of users (e.g., respondents, customers).

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
    generating a domain-event object schema for a domain-event object definition comprising domain-event-listener conditions used to identify domain-event objects that meet the domain-event object definition within a multi-platform data stream;
    providing the domain-event object schema to a schema library for the multi-platform data stream;
    identifying, within the multi-platform data stream, a domain-event object based on an entity identifier for the domain-event object satisfying the domain-event-listener conditions;
    identifying an object event for the domain-event object; and
    performing an action based on the object event for the domain-event object.

2. The computer-implemented method of claim 1, further comprising determining that the entity identifier for the domain-event object satisfies the domain-event-listener conditions by determining that the entity identifier satisfies a logic condition for at least one of a type of digital entity, a digital-entity-creation time, an object-event-occurrence time, or an object-event type.

3. The computer-implemented method of claim 1, further comprising:
    in response to performing the action, generating an additional domain-event object comprising an additional entity identifier and an additional object event corresponding to the action; and
    providing the additional domain-event object to the multi-platform data stream.

4. The computer-implemented method of claim 1, wherein performing the action comprises at least one of transmitting an electronic communication, configuring a ticket, triggering a platform process, modifying a platform workflow, updating a digital reporting interface, or modifying a platform parameter within a digital-analytics platform to reflect the domain-event object.

5. The computer-implemented method of claim 1, wherein identifying the object event comprises identifying at least one of a creation of, an assignment of, a transmission of, a modification to, an interaction with, a publication of, an update of, a sharing of, a subscription to, an unsubscription to, or a rejection of a digital entity corresponding to the entity identifier.

6. The computer-implemented method of claim 5, wherein the digital entity comprises a contact, a form, a ticket, a response, a distribution, a survey invitation, a list member, or a segment member.

7. The computer-implemented method of claim 1, further comprising:
    determining that the domain-event object corresponds to a third-party platform; and
    performing the action within a digital-analytics platform in response to a third-party platform action taken on the third-party platform as indicated by the domain-event object.

8. A non-transitory computer-readable storage medium comprising instructions that, when executed by at least one processor, cause a computing device to:
    generate a domain-event object schema for a domain-event object definition comprising domain-event-listener conditions used to identify domain-event objects that meet the domain-event object definition within a multi-platform data stream;
    provide the domain-event object schema to a schema library for the multi-platform data stream;
    identify, within the multi-platform data stream, a domain-event object based on an entity identifier for the domain-event object satisfying the domain-event-listener conditions;
    identify an object event for the domain-event object; and
    perform an action based on the object event for the domain-event object.

9. The non-transitory computer-readable storage medium of claim 8, further comprising instructions that, when executed by the at least one processor, cause the computing device to determine that the entity identifier for the domain-event object satisfies the domain-event-listener conditions by determining that the entity identifier satisfies a logic condition for at least one of a type of digital entity, a digital-entity-creation time, an object-event-occurrence time, or an object-event type.

10. The non-transitory computer-readable storage medium of claim 8, further comprising instructions that, when executed by the at least one processor, cause the computing device to:
    in response to performing the action, generate an additional domain-event object comprising an additional entity identifier and an additional object event corresponding to the action; and
    provide the additional domain-event object to the multi-platform data stream.

11. The non-transitory computer-readable storage medium of claim 8, further comprising instructions that, when executed by the at least one processor, cause the computing device to perform the action by performing at least one of the following operations: transmitting an electronic communication, configuring a ticket, triggering a platform process, modifying a platform workflow, updating a digital reporting interface, or modifying a platform parameter within a digital-analytics platform to reflect the domain-event object.

12. The non-transitory computer-readable storage medium of claim 8, further comprising instructions that, when executed by the at least one processor, cause the computing device to identify the object event by identifying at least one of: a creation of, an assignment of, a transmission of, a modification to, an interaction with, a publication of, an update of, a sharing of, a subscription to, an unsubscription to, or a rejection of a digital entity corresponding to the entity identifier, wherein the digital entity comprises a contact, a form, a ticket, a response, a distribution, a survey invitation, a list member, or a segment member.

13. The non-transitory computer-readable storage medium of claim 8, further comprising instructions that, when executed by the at least one processor, cause the computing device to:
provide, for display within a graphical user interface of an administrator device, a selectable domain-event-listener condition in relation to the entity identifier for the domain-event object;
receive, from the administrator device, an indication of a selection of the selectable domain-event-listener condition; and
based on the selection of the selectable domain-event-listener condition, add the selectable domain-event-listener condition to the domain-event-listener conditions.

14. The non-transitory computer-readable storage medium of claim 13, further comprising instructions that, when executed by the at least one processor, cause the computing device to:
provide, for display within the graphical user interface of the administrator device, a platform-action option for the action to be performed upon satisfaction of the selectable domain-event-listener condition;
receive, from the administrator device, an indication of a selection of the platform-action option; and
based on the selection of the platform-action option, associate the action with the domain-event-listener conditions such that the action is performed upon satisfying the selectable domain-event-listener condition.

15. A system comprising:
at least one processor; and
at least one non-transitory computer-readable storage medium comprising instructions that, when executed by the at least one processor, cause the system to:
generate a domain-event object schema for a domain-event object definition comprising domain-event-listener conditions used to identify domain-event objects that meet the domain-event object definition within a multi-platform data stream;
provide the domain-event object schema to a schema library for the multi-platform data stream;
identify, within the multi-platform data stream, a domain-event object based on an entity identifier for the domain-event object satisfying the domain-event-listener conditions;
identify an object event for the domain-event object; and
perform an action based on the object event for the domain-event object.

16. The system of claim 15, wherein the at least one non-transitory computer-readable storage medium further comprises instructions that, when executed by the at least one processor, cause the system to determine that the entity identifier for the domain-event object satisfies the domain-event-listener conditions by determining that the entity identifier satisfies a logic condition for at least one of a type of digital entity, a digital-entity-creation time, an object-event-occurrence time, or an object-event type.

17. The system of claim 15, wherein the at least one non-transitory computer-readable storage medium further comprises instructions that, when executed by the at least one processor, cause the system to perform the action by performing at least one of the following operations: transmitting an electronic communication, configuring a ticket, triggering a platform process, modifying a platform workflow, updating a digital reporting interface, or modifying a platform parameter within a digital-analytics platform to reflect the domain-event object.

18. The system of claim 15, wherein the at least one non-transitory computer-readable storage medium further comprises instructions that, when executed by the at least one processor, cause the system to identify the object event by identifying at least one of: a creation of, an assignment of, a transmission of, a modification to, an interaction with, a publication of, an update of, a sharing of, a subscription to, an unsubscription to, or a rejection of a digital entity corresponding to the entity identifier.

19. The system of claim 15, wherein the at least one non-transitory computer-readable storage medium further comprises instructions that, when executed by the at least one processor, cause the system to:
generate a new domain-event object schema for a new domain-event object definition comprising new domain-event-listener conditions used to identify a new domain-event object within the multi-platform data stream; and
provide the new domain-event object schema to the schema library for the multi-platform data stream.

20. The system of claim 15, wherein the at least one non-transitory computer-readable storage medium further comprises instructions that, when executed by the at least one processor, cause the system to identify an additional action to perform based on the object event for the domain-event object.

* * * * *